United States Patent
Lund-Laverick et al.

(10) Patent No.: US 12,053,939 B2
(45) Date of Patent: Aug. 6, 2024

(54) MOULD TOOL FOR MANUFACTURE OF A WIND TURBINE BLADE

(71) Applicants: Blade Dynamics Limited, Hampshire (GB); LM Wind Power A/S, Kolding (DK)

(72) Inventors: Michael Lund-Laverick, Kolding (DK); Rama Razeghi, Eastleigh (GB); Klavs Jespersen, Kolding (DK)

(73) Assignees: LM WINDPOWER A/S, Kolding (DK); BLADE DYNAMICS LIMITED, Eastleigh (GB)

( * ) Notice: Subject to any disclaimer, the term of this patent is extended or adjusted under 35 U.S.C. 154(b) by 263 days.

(21) Appl. No.: 17/431,355

(22) PCT Filed: Feb. 21, 2020

(86) PCT No.: PCT/EP2020/054647
§ 371 (c)(1),
(2) Date: Aug. 16, 2021

(87) PCT Pub. No.: WO2020/169815
PCT Pub. Date: Aug. 27, 2020

(65) Prior Publication Data
US 2022/0134685 A1    May 5, 2022

(30) Foreign Application Priority Data
Feb. 22, 2019 (GB) .................................... 1902448

(51) Int. Cl.
*B29C 70/32*    (2006.01)
*B29C 33/34*    (2006.01)
(Continued)

(52) U.S. Cl.
CPC .............. *B29C 70/44* (2013.01); *B29C 33/34* (2013.01); *B29D 99/0028* (2013.01); *B29L 2031/085* (2013.01)

(58) Field of Classification Search
None
See application file for complete search history.

(56) References Cited

U.S. PATENT DOCUMENTS 5,091,029 A    2/1992   Davis et al.
9,080,024 B2 *   7/2015   Weimer .................. B32B 37/06
(Continued)

FOREIGN PATENT DOCUMENTS

GB        2460741 A     12/2009
WO    2010100481 A2    9/2010
(Continued)

OTHER PUBLICATIONS

International Search Report issued on Jun. 2, 2020 for application No. PCT/EP2020/054647.
(Continued)

*Primary Examiner* — Kayla Mccaffrey
(74) *Attorney, Agent, or Firm* — Nath, Goldberg & Meyer; Tanya E. Harkins

(57) ABSTRACT

Disclosed is a mould tool for manufacturing a plurality of pre-form laminates for a laminate of a wind turbine blade, the mould tool comprising a frame, a first mould surface configured for receiving a first fabric, a second mould surface configured for receiving a second fabric, and a heating arrangement configured to heat the first mould surface and the second mould surface. The mould tool is configured to turn between a first configuration and a second configuration, wherein in the first configuration the first
(Continued)

mould surface is facing substantially upwards, and in the second configuration the second mould surface is facing substantially upwards.

16 Claims, 16 Drawing Sheets

(51) Int. Cl.
*B29C 70/44* (2006.01)
*B29D 99/00* (2010.01)
*B29L 31/08* (2006.01)

(56) References Cited

U.S. PATENT DOCUMENTS

| | | | |
|---|---|---|---|
| 9,539,768 B2* | 1/2017 | Kwon | B29C 70/386 |
| 10,137,613 B2* | 11/2018 | Solovyov | B29C 41/042 |
| 10,391,722 B1* | 8/2019 | Traustadottir | B29D 99/0025 |
| 2014/0090772 A1 | 4/2014 | Cano Cediel et al. | |
| 2014/0342028 A1 | 11/2014 | Kwon et al. | |

FOREIGN PATENT DOCUMENTS

| | | |
|---|---|---|
| WO | 2011012145 A1 | 2/2011 |
| WO | 2012126479 A2 | 9/2012 |
| WO | 2012126479 A3 | 9/2012 |

OTHER PUBLICATIONS

Combined Search and Examination Report issued on Aug. 19, 2019 for application No. GB1902448.8.

* cited by examiner

MOULD TOOL FOR MANUFACTURE OF A WIND TURBINE BLADE

This is a National Phase Application filed under 35 U.S.C. 371 as a national stage of PCT/EP2020/054647, filed Feb. 21, 2020, an application claiming the benefit of British Patent Application No. 1902448.8, filed Feb. 22, 2019, the content of each of which is hereby incorporated by reference in its entirety.

FIELD OF THE INVENTION

The present disclosure relates to manufacture of wind turbine blades. More specifically, the present disclosure pertains to the field of a mould tool, such as a mould tool for manufacturing a plurality of pre-form laminates for a laminate of a wind turbine blade.

BACKGROUND OF THE INVENTION

Wind turbine blades of fibre-reinforced polymer and in particular the aerodynamic shells of wind turbine blades are usually manufactured in moulds, where the pressure side and the suction side of the blade are manufactured separately by arranging glass fibre mats and/or other fibre-reinforcement material, such as carbon fibre, in each of the two moulds. Afterwards, one of the two halves is turned upside down and positioned on top of the other of the two halves, and the two halves are adhered together. The blade parts may be positioned on top of each other by turning and repositioning the complete half mould.

A wind turbine blade may be manufactured by infusing fibres, such as glass fibre mats and/or carbon fibre mats with a resin, such as polyester or epoxy. Infusion of the fibres may be provided by vacuum assisted resin transfer moulding (VARTM).

A wind turbine blade may comprise both glass fibre laminate and carbon fibre laminate or only glass fibres, where wind turbine blades comprising both glass and carbon fibres have some advantages over the latter, e.g. reduced weight. For example, the skin part of the wind turbine blade may be provided with glass fibre while load carrying structures, such as spar caps, may be provided with carbon fibre. During manufacture of a wind turbine blade with both glass fibre and carbon fibres, to control and ensure correct alignment of the different fibre sheets, the fibres may be laid out in the blade mould in two separate instances, e.g. first the glass fibre sheets and afterwards the carbon fibre sheets and infused between each instance. Thus, the infusion process is performed twice, one infusion for the glass fibres and a second infusion for the carbon fibres. The infusion process is time consuming thus, in an effort to reduce manufacturing time, it would be advantageous to reduce infusion time.

Furthermore, some regions of the wind turbine blade need to be relatively strong. In these regions of the blade a plurality of fabric sheets is stacked on top of each other. Stacking these fabric sheets is time consuming and require precision, thus, reduction of the time spent on laying up the fibres in the blade mould may also be desirable. It is known to form pre-forms comprising a plurality of fabric sheets offline, i.e. outside the blade mould. The plurality of fabric sheets may comprise carbon fibres or glass fibres, which are cut and stacked to form a desired pre-form shape. The sheets may comprise a tackifier binding the sheets together during a consolidation process. The pre-form may subsequently be placed in a desired location in the blade mould in one single operation, thereby reducing the time spent with the blade mould on stacking sheets of fabric in the blade mould. However, a disadvantage with making pre-formed sections of laminates is that they require a substantial extra amount of factory space.

SUMMARY OF THE INVENTION

It is an object of the present disclosure to provide a mould tool and a method for manufacturing a plurality of pre-form laminates which overcomes at least some of the disadvantages of the prior art.

In particular, it is an object of the present invention to provide a mould tool and a method for manufacturing a plurality of pre-form laminates which reduces the infusion time during manufacturing of wind turbine blades, e.g. by facilitating a single infusion process for infusing both glass fibre parts and carbon fibre parts in the wind turbine blade mould (may be a half-mould) simultaneously.

Thus, the present invention relates to manufacture of a plurality of pre-form laminates for a laminate of a wind turbine blade. The pre-form laminates may comprise sheets of fibres, such as carbon fibres, which are adhered together by an adhesive, and which may be positioned together with other sheets of fibres, such as glass fibres, in the wind turbine blade mould. This may facilitate simultaneous resin infusion of both types of fibres, e.g. glass fibre and carbon fibre. The adhesive of the pre-form laminates may be configured to be dissolved by the resin as it is infused, such that the adhesive is replaced by resin during the infusion process.

In particular, the present invention relates to a mould tool for manufacturing a plurality of pre-form laminates for a laminate of a wind turbine blade, e.g. including a first pre-form laminate and a second pre-form laminate, for a laminate of a wind turbine blade.

The mould tool comprises a frame, a first mould surface configured for receiving a first fabric, a second mould surface configured for receiving a second fabric, and a heating arrangement configured to heat the first mould surface and the second mould surface.

The mould tool is configured to turn between a first configuration and a second configuration, wherein in the first configuration the first mould surface is facing substantially upwards, and in the second configuration the second mould surface is facing substantially upwards. In the first configuration the second mould surface may be facing substantially downwards. In the second configuration the first mould surface may be facing substantially downwards.

The mould tool may be configured to receive the first fabric on the first mould surface while being in the first configuration.

The mould tool may be configured to while the first fabric is being consolidated including heating the first mould surface: turn the mould tool to be in the second configuration and receive the second fabric on the second mould surface.

The mould tool may comprise a third mould surface. The mould tool may be configured to turn between the first configuration, the second configuration and a third configuration. In the third configuration the third mould surface may be facing substantially upwards. The third mould surface may be configured for receiving a third fabric.

Also disclosed is a method for manufacturing a plurality of pre-form laminates for a laminate of a wind turbine blade with a mould tool, such as the mould tool disclosed above.

The method comprises positioning the mould tool in the first configuration, providing a first fabric, laying up the first fabric on the first mould surface, restraining the first fabric on the first mould surface, and consolidating the first fabric including heating the first mould surface to form a first pre-form laminate of the plurality of pre-form laminates.

The method comprises, while consolidating the first fabric, turning the mould tool to the second configuration, providing a second fabric, laying up the second fabric on the second mould surface, restraining the second fabric on the second mould surface, and consolidating the second fabric including heating the second mould surface to form a second pre-form laminate of the plurality of pre-form laminates.

It is an advantage of the present disclosure that a plurality of pre-form laminates may be provided with reduced space requirement, e.g. several pre-form laminates may be manufactured at a ground area not much bigger than a single pre-form laminate.

It is an advantage of the present disclosure that a plurality of pre-form laminates may be provided, such that a single infusion may be facilitated during manufacturing of a wind turbine blade, thereby reducing manufacturing time.

It is a further advantage of the present disclosure that it may reduce the infusion time of the wind turbine blade by facilitating the infusion process in the blade mould to be performed in one step; infusing the different fibres, e.g. glass fibres and carbon fibres, at the same time, once the one fibre type, e.g. carbon fibres, have been placed in a controlled way as the pre-form laminate to reduce or even avoid the risk of defects.

The mould tool may comprise a plurality of mould surfaces including the first mould surface and the second mould surface. The plurality of mould surfaces may include the third mould surface. The plurality of mould surfaces may include more mould surfaces, such as a fourth mould surface and a fifth mould surface.

The mould surfaces may be configured for receiving fabrics, e.g. the first mould surface is configured to receive a first fabric, the second mould surface is configured to receive a second fabric, and the third mould surface may be configured to receive a third fabric. The first mould surface may be configured to receive a first secondary fabric. The second mould surface may be configured to receive a second secondary fabric. The third mould surface may be configured to receive a third secondary fabric.

Consolidation of the fabrics, e.g. including heating of the fabrics, forms the pre-form laminates. For example, consolidation of the first fabric forms the first pre-form laminate and consolidation of the second fabric forms the second pre-form laminate. Consolidation of the third fabric forms the third pre-form laminate. Consolidation of the first secondary fabric forms the first secondary pre-form laminate. Consolidation of the second secondary fabric forms the second secondary pre-form laminate. Consolidation of the third secondary fabric forms the third secondary pre-form laminate.

The pre-form laminates are not necessarily rigid after being consolidated. For example, the pre-form laminates may be flexible after the consolidation process. For example, the pre-form laminates may be able to attain some degree of curvature after consolidation, e.g. when being positioned in the wind turbine blade mould.

The pre-form laminates may constitute a part of the main laminate of the wind turbine blade. The pre-form laminates may constitute a part of the spar cap of a wind turbine blade. A fabric, such as the first fabric and/or the second fabric and/or the third fabric and/or the first secondary fabric and/or the second secondary fabric and/or the third secondary fabric, may comprise carbon fibres.

A fabric may comprise a plurality of sheets of fabric and/or a plurality of sets of a plurality of sheets of fabric. A fabric may comprise carbon fibres. A fabric may be prefabricated with a tackifier. A fabric may be a pre-preg fabric. Alternatively, the fabric may be dry fabric.

The first fabric may comprise a plurality of sheets of fabric and/or a plurality of sets of a plurality of sheets of fabric. The first fabric may comprise carbon fibres. The first fabric may be prefabricated with a tackifier. The first fabric may be a pre-preg fabric. Alternatively, the first fabric may be dry fabric.

The second fabric may comprise a plurality of sheets of fabric and/or a plurality of sets of a plurality of sheets of fabric. The second fabric may comprise carbon fibres. The second fabric may be prefabricated with a tackifier. The second fabric may be a pre-preg fabric. Alternatively, the second fabric may be dry fabric.

The first secondary fabric may comprise a plurality of sheets of fabric and/or a plurality of sets of a plurality of sheets of fabric. The first secondary fabric may comprise carbon fibres. The first secondary fabric may be prefabricated with a tackifier. The first secondary fabric may be a pre-preg fabric. Alternatively, the first secondary fabric may be dry fabric.

The third fabric may comprise a plurality of sheets of fabric and/or a plurality of sets of a plurality of sheets of fabric. The third fabric may comprise carbon fibres. The third fabric may be prefabricated with a tackifier. The third fabric may be a pre-preg fabric. Alternatively, the third fabric may be dry fabric.

The second secondary fabric may comprise a plurality of sheets of fabric and/or a plurality of sets of a plurality of sheets of fabric. The second secondary fabric may comprise carbon fibres. The second secondary fabric may be prefabricated with a tackifier. The second secondary fabric may be a pre-preg fabric. Alternatively, the second secondary fabric may be dry fabric.

The third secondary fabric may comprise a plurality of sheets of fabric and/or a plurality of sets of a plurality of sheets of fabric. The third secondary fabric may comprise carbon fibres. The third secondary fabric may be prefabricated with a tackifier. The third secondary fabric may be a pre-preg fabric. Alternatively, the third secondary fabric may be dry fabric.

A mould surface may comprise a centre point. For example, the first mould surface may comprise a first centre point. The second mould surface may comprise a second centre point. The third mould surface may comprise a third centre point.

A normal to the first mould surface at the first centre point may point in a first primary direction in the first configuration. A normal to the second mould surface at the second centre point may point in a second primary direction in the first configuration. A normal to the third mould surface at the third centre point may point in a third primary direction in the first configuration.

The first primary direction and the second primary direction may be angularly spaced by more than 90 degrees, such as by 120 degrees and/or 180 degrees. The first primary direction and the third primary direction may be angularly spaced by between 72 and 120 degrees, such as 90 degrees. The second primary direction and the third primary direction may be angularly spaced between 72 and 120 degrees, such as 90 degrees.

The normal to the first mould surface at the first centre point may point in a first secondary direction in the second configuration. The normal to the second mould surface at the second centre point may point in a second secondary direction in the second configuration. The normal to the third mould surface at the third centre point may point in a third secondary direction in the second configuration.

The first secondary direction and the second secondary direction may be angularly spaced by more than 90 degrees, such as by 120 degrees and/or 180 degrees. The first secondary direction and the third secondary direction may be angularly spaced by between 72 and 120 degrees, such as 90 degrees. The second secondary direction and the third secondary direction may be angularly spaced between 72 and 120 degrees, such as 90 degrees.

The normal to the first mould surface at the first centre point may point in a first tertiary direction in the third configuration. The normal to the second mould surface at the second centre point may point in a second tertiary direction in the third configuration. The normal to the third mould surface at the third centre point may point in a third tertiary direction in the third configuration.

The first tertiary direction and the second tertiary direction may be angularly spaced by more than 90 degrees, such as by 120 degrees and/or 180 degrees. The first tertiary direction and the third tertiary direction may be angularly spaced by between 72 and 120 degrees, such as 90 degrees. The second tertiary direction and the third tertiary direction may be angularly spaced between 72 and 120 degrees, such as 90 degrees.

The mould tool may be turned about a rotation axis. The rotation axis may be a longitudinal axis of the mould tool and/or the rotation axis may be parallel to the longitudinal axis of the mould tool. The mould tool may comprise a turning device configured for turning the mould between the configurations, such as between the first configuration and the second configuration and/or between the first configuration and the third configuration and/or between the second configuration and the third configuration. The turning device may rotate about the rotation axis, such as the longitudinal axis of the mould tool.

The first primary direction may be upwards, such as above horizontal. The first primary direction may be substantially vertical, such as vertically upwards. The first primary direction may be in a plane perpendicular to the rotation axis and/or perpendicular to the longitudinal axis of the mould tool.

The second primary direction may be downwards, such as below horizontal. The second primary direction may be substantially vertical, such as vertically downwards. The second primary direction may be in the plane perpendicular to the rotation axis and/or perpendicular to the longitudinal axis of the mould tool.

The first primary direction may be the opposite direction of the second primary direction.

The third primary direction may be downwards, such as below horizontal. Alternatively, the third primary direction may be substantially horizontal. The third primary direction may be in the plane perpendicular to the rotation axis and/or perpendicular to the longitudinal axis of the mould tool.

The first secondary direction may be downwards, such as below horizontal. The first secondary direction may be substantially vertical, such as vertically downwards. The first secondary direction may be in the plane perpendicular to the rotation axis and/or perpendicular to the longitudinal axis of the mould tool.

The second secondary direction may be upwards, such as above horizontal. The second secondary direction may be substantially vertical, such as vertically upwards. The second secondary direction may be in the plane perpendicular to the rotation axis and/or perpendicular to the longitudinal axis of the mould tool.

The first secondary direction may be the opposite direction of the second secondary direction.

The third secondary direction may be downwards, such as below horizontal. Alternatively, the third secondary direction may be substantially horizontal. The third secondary direction may be in the plane perpendicular to the rotation axis and/or perpendicular to the longitudinal axis of the mould tool.

The first tertiary direction may be downwards, such as below horizontal. Alternatively, the first tertiary direction may be substantially horizontal. The first tertiary direction may be in the plane perpendicular to the rotation axis and/or perpendicular to the longitudinal axis of the mould tool.

The second tertiary direction may be downwards, such as below horizontal. Alternatively, the second tertiary direction may be substantially horizontal. The second tertiary direction may be in the plane perpendicular to the rotation axis and/or perpendicular to the longitudinal axis of the mould tool.

The first tertiary direction may be the opposite direction of the second tertiary direction.

The third tertiary direction may be upwards, such as above horizontal. The third tertiary direction may be substantially vertical, such as vertically upwards. The third tertiary direction may be in the plane perpendicular to the rotation axis and/or perpendicular to the longitudinal axis of the mould tool.

A mould surface, such as the first mould surface and/or the second mould surface and/or the third mould surface, may be curved, e.g. to account for the geometry of the surface of the wind turbine blade shell. A mould surface, such as the first mould surface and/or the second mould surface and/or the third mould surface may be planar. Some of the mould surfaces may be planar while others of the mould surfaces may be curved. One or more or all of the mould surfaces may be curved. One or more or all of the mould surfaces may be planar.

The curvature of a mould surface, such as the curvature of the first mould surface and/or the second mould surface and/or the third mould surface, may be concave, e.g. to account for the geometry of the upwind or the downwind surface of the wind turbine blade shell. The curvature of a mould surface, such as the curvature of the first mould surface and/or the second mould surface and/or the third mould surface, may be convex, e.g. to account for the geometry of the downwind or the upwind surface of the wind turbine blade shell. Some of the mould surfaces may be concave others of the mould surfaces may be convex and others of the mould surfaces may be planar. For example, the curvature of the first mould surface may be convex and the curvature of the second mould surface may be concave. The first mould surface and the second mould surface may have the same curvature. The first mould surface and the second mould surface may have the opposite curvature. The first mould surface and the third mould surface may have the same curvature. The first mould surface and the third mould surface may have the opposite curvature. The third mould surface and the second mould surface may have the same curvature. The third mould surface and the second mould surface may have the opposite curvature.

One or more sealing members may be provided. For example, the mould tool may comprise one or more sealing members. For example, the mould tool may comprise a first sealing member and/or a second sealing member and/or a third sealing member. The first sealing member and/or the second sealing member and/or the third sealing member may comprise a lid and optionally a clamp for locking the lid in a closed position. The lid may be hinged to a side of a respective mould surface.

The first sealing member and/or the second sealing member and/or the third sealing member may comprise a vacuum bag. The vacuum bag may be applied to the mould surface, such as the first mould surface and/or the second mould surface and/or the third mould surface, respectively. The vacuum bag may be fastened, e.g. by double sided tape, to the edges of the respective mould surface, such as the first mould surface and/or the second mould surface and/or the third mould surface.

Restraining a fabric may comprise closing the sealing member over the respective mould surface. Restraining the first fabric may comprise closing the first sealing member over the first mould surface. Restraining the second fabric may comprise closing the second sealing member over the first mould surface. Restraining the third fabric may comprise closing the third sealing member over the third mould surface. Restraining the first secondary fabric may comprise closing the first sealing member over the first mould surface. Restraining the second secondary fabric may comprise closing the second sealing member over the second mould surface. The sealing member(s) secures the pre-form laminate(s) from falling out when the mould tool is turned.

Consolidating a fabric may comprise applying vacuum between the respective sealing member and mould surface. Consolidating the first fabric may comprise applying vacuum between the first sealing member and the first mould surface. Consolidating the second fabric may comprise applying vacuum between the second sealing member and the second mould surface. Consolidating the third fabric may comprise applying vacuum between the third sealing member and the third mould surface. Consolidating the first secondary fabric may comprise applying vacuum between the first sealing member and the first mould surface. Consolidating the second secondary fabric may comprise applying vacuum between the second sealing member and the second mould surface. Consolidating the third secondary fabric may comprise applying vacuum between the third sealing member and the third mould surface.

The method may comprise, e.g. while consolidating the second fabric and/or the third fabric, turning the mould tool to the first configuration and demoulding the first pre-form laminate.

The method may comprise, e.g. after demoulding the first pre-form laminate, providing a first secondary fabric and laying up the first secondary fabric on the first mould surface. The method may further comprise restraining the first secondary fabric on the first mould surface, e.g. with the first sealing member, and consolidating the first secondary fabric including heating the first mould surface to form a first secondary pre-form laminate of the plurality of pre-form laminates.

The method may comprise, e.g. while consolidating the second fabric and/or the first fabric, turning the mould tool to the third configuration, providing a third fabric and laying up the third fabric on the third mould surface. The method may further comprise restraining the third fabric on the third mould surface, e.g. with the third sealing member, and consolidating the third fabric including heating the third mould surface to form a third pre-form laminate of the plurality of pre-form laminates.

The method may comprise turning the mould tool to the second configuration and demoulding the second pre-form laminate.

Laying up a fabric on a mould surface may comprise applying a tackifier to the fabric. For example, laying up the first fabric on the first mould surface may comprise applying a tackifier to the first fabric. Laying up the second fabric on the second mould surface may comprise applying a tackifier to the second fabric. Laying up the first secondary fabric on the first mould surface may comprise applying a tackifier to the first secondary fabric. Laying up the second secondary fabric on the second mould surface may comprise applying a tackifier to the second secondary fabric. Laying up the third fabric on the third mould surface may comprise applying a tackifier to the third fabric. Laying up the third secondary fabric on the third mould surface may comprise applying a tackifier to the third secondary fabric.

Providing a fabric may comprise providing the fabric prefabricated with a tackifier. For example, providing the first fabric may comprise providing a first fabric prefabricated with a tackifier. Providing the second fabric may comprise providing a second fabric prefabricated with a tackifier. Providing the third fabric may comprise providing a third fabric prefabricated with a tackifier. Providing the first secondary fabric may comprise providing a first secondary fabric prefabricated with a tackifier. Providing the second secondary fabric may comprise providing a second secondary fabric prefabricated with a tackifier. Providing the third secondary fabric may comprise providing a third secondary fabric prefabricated with a tackifier.

It is envisaged that any embodiments or elements as described in connection with any one aspect may be used with any other aspects or embodiments, mutatis mutandis.

BRIEF DESCRIPTION OF THE FIGURES

Embodiments of the invention will be described in more detail in the following with regard to the accompanying figures. Like reference numerals refer to like elements throughout. Like elements may, thus, not be described in detail with respect to the description of each figure. The figures show one way of implementing the present invention and are not to be construed as being limiting to other possible embodiments falling within the scope of the attached claim set. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

DETAILED DESCRIPTION

In the following figure description, the same reference numbers refer to the same elements and may thus not be described in relation to all figures.

Figure 1:
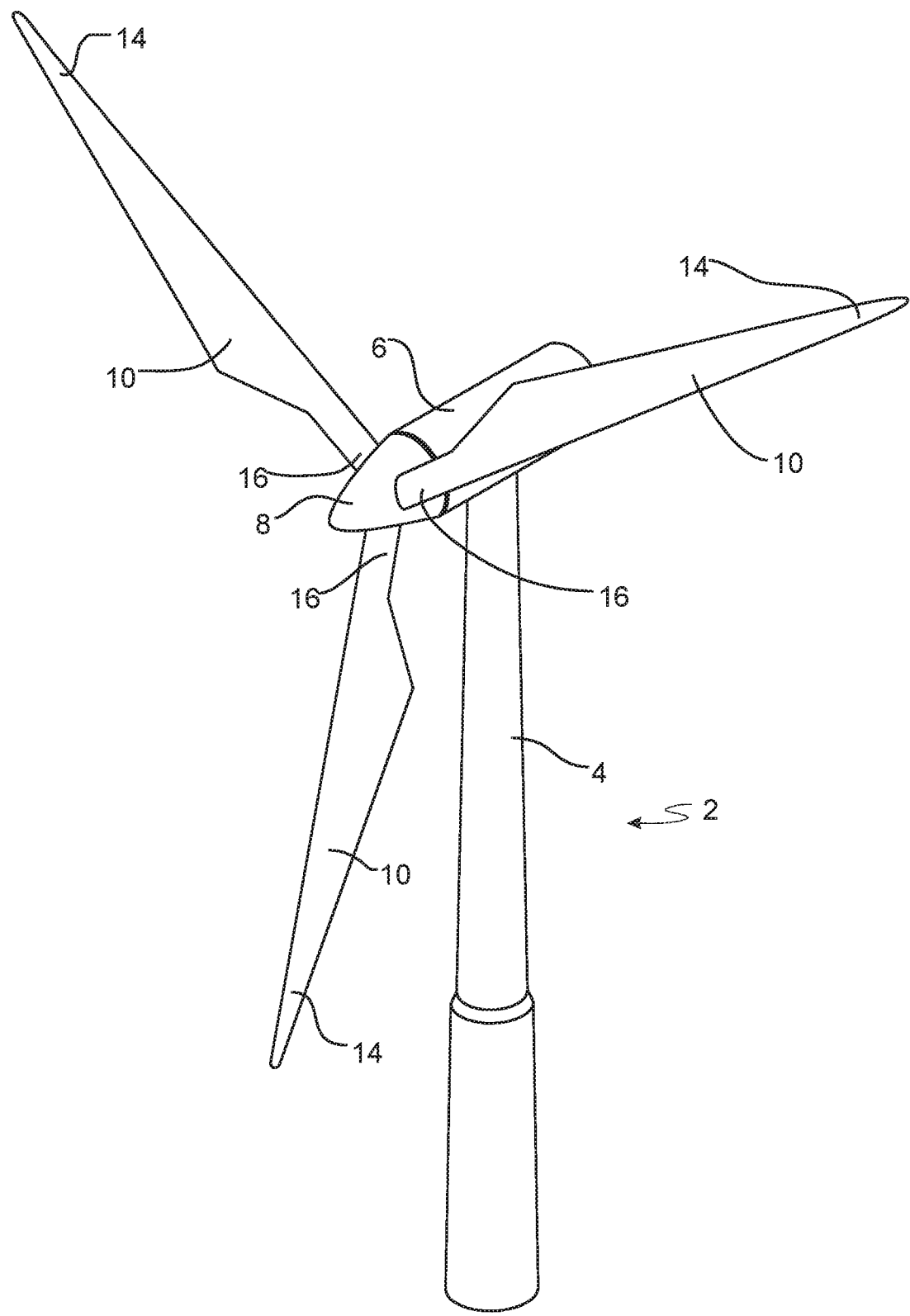
FIG. 1 is a schematic diagram illustrating an exemplary wind turbine.

FIG. 1 illustrates a conventional modern upwind wind turbine 2 according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 furthest from the hub 8.

Figure 2:
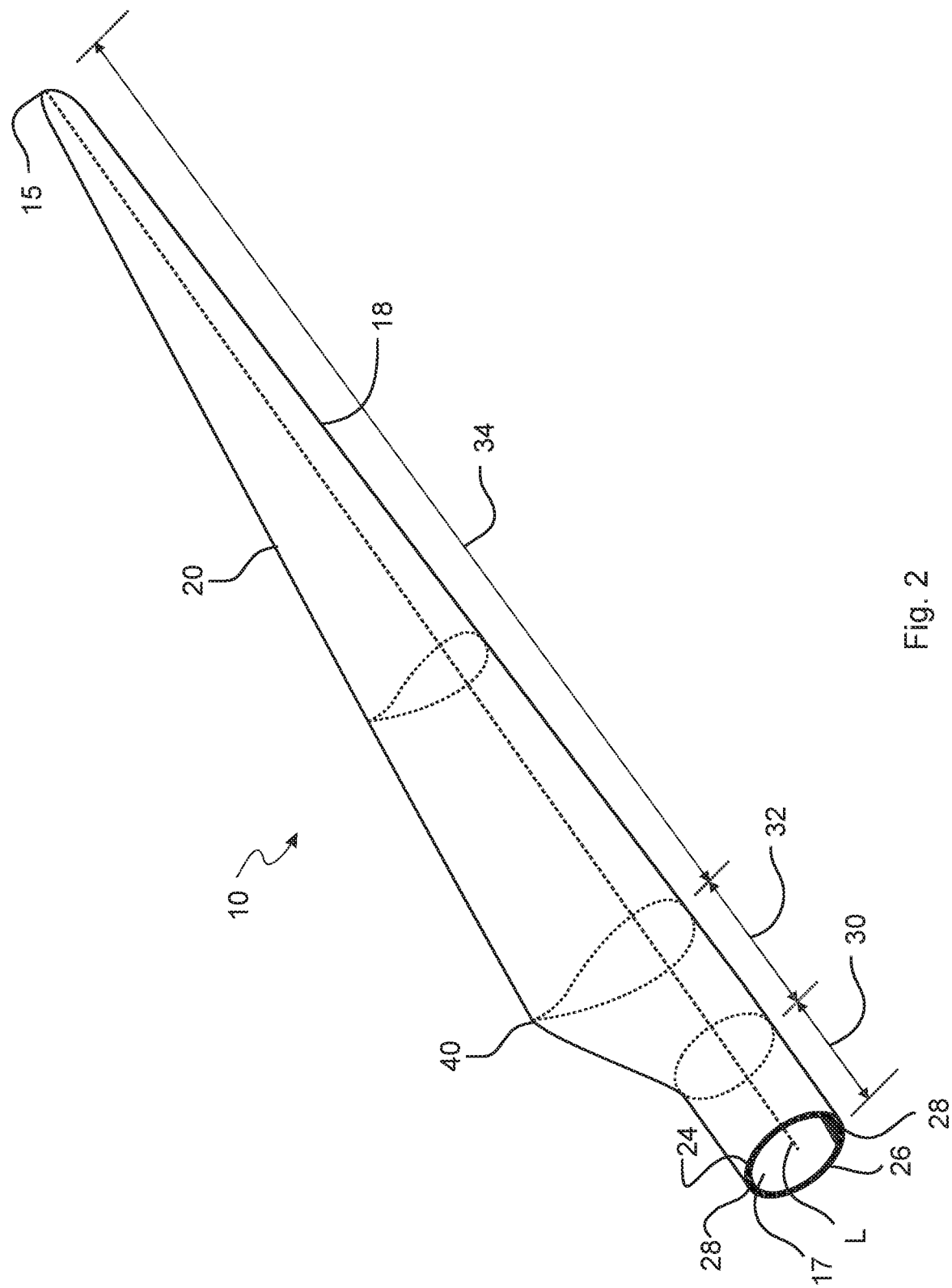
FIG. 2 is a schematic diagram illustrating an exemplary wind turbine blade.

FIG. 2 shows a schematic view of an exemplary wind turbine blade 10. The wind turbine blade 10 has the shape of a conventional wind turbine blade with a root end and a tip end and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

A shoulder 40 of the blade 10 is defined as the position, where the blade 10 has its largest chord length. The shoulder 40 is typically provided at the boundary between the transition region 32 and the airfoil region 34.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

The wind turbine blade 10 comprises a blade shell comprising two blade shell parts, a first blade shell part 24 and a second blade shell part 26, typically made of fibre-reinforced polymer. The first blade shell part 24 is typically a pressure side or upwind blade shell part. The second blade shell part 26 is typically a suction side or downwind blade shell part. The first blade shell part 24 and the second blade shell part 26 are fastened together with adhesive, such as glue, along bond lines or glue joints 28 extending along the trailing edge 20 and the leading edge 18 of the blade 10. Typically, the root ends of the blade shell parts 24, 26 has a semi-circular or semi-oval outer cross-sectional shape.

Figure 3:
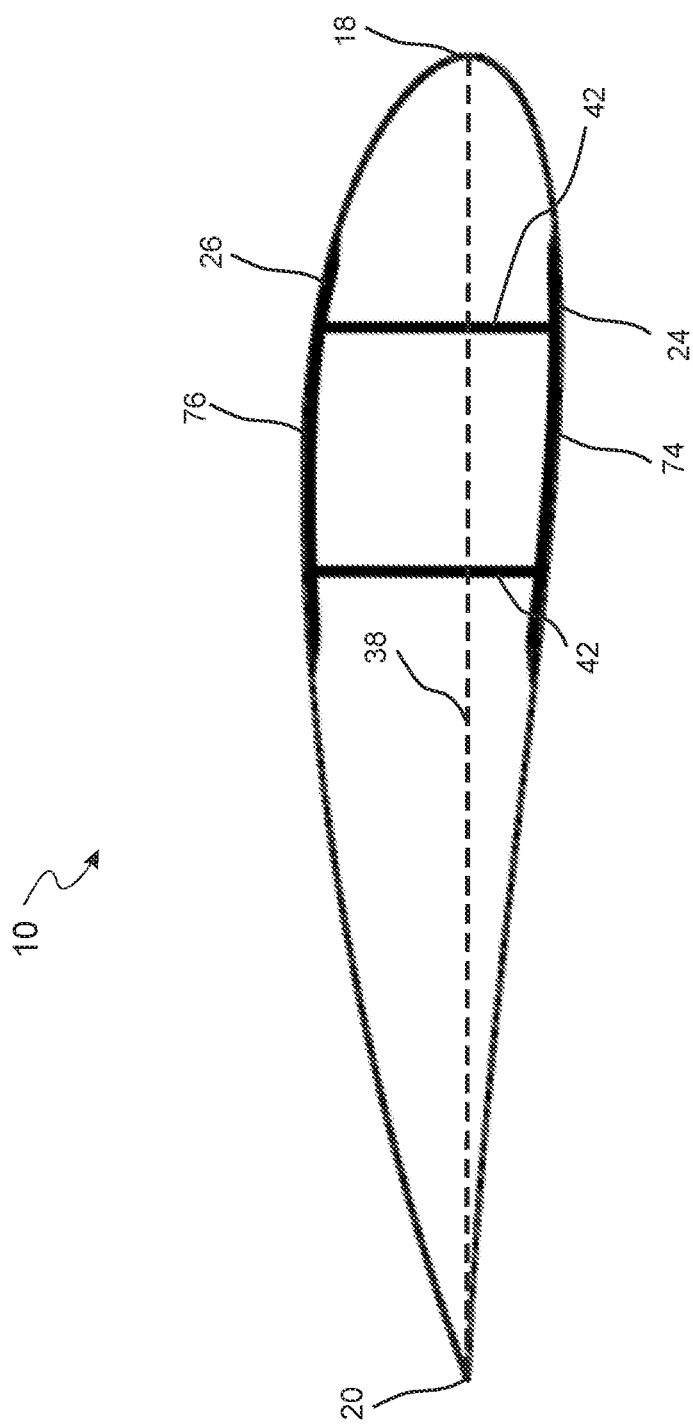
FIG. 3 is a schematic diagram illustrating a cross section of an exemplary wind turbine blade.

FIG. 3 is a schematic diagram illustrating a cross sectional view of an exemplary wind turbine blade 10, e.g. a cross sectional view of the airfoil region of the wind turbine blade 10. The wind turbine blade 10 comprises a leading edge 18, a trailing edge 20, a pressure side 24, a suction side 26 a first spar cap 74, and a second spar cap 76. The wind turbine blade 10 comprises a chord line 38 between the leading edge 18 and the trailing edge 20. The wind turbine blade 10 comprises shear webs 42, such as a leading edge shear web and a trailing edge shear web. The shear webs 42 could alternatively be a spar box with spar sides, such as a trailing edge spar side and a leading edge spar side. The spar caps 74, 76 may comprise carbon fibres while the rest of the shell parts 24, 26 may comprise glass fibres. Employing both glass fibres and carbon fibres may provide challenges in order to maintain orientation of fibre-layers when different fibre-types react differently while infusing and curing with resin and also challenging maintaining fibre straightness, especially in carbon fibres, during a single infusion manufacturing process. One way of solving this issue have been to utilize a dual infusion process involving infusing and curing of one fibre type, and afterwards laying up the second fibre type which is then infused and cured. To reduce total infusion and curing time required for manufacturing of a wind turbine blade comprising both glass fibres and carbon fibres, the spar caps 76, 78, e.g. being made of carbon fibres, may be provided as pre-form laminates, where an adhesive is applied to the carbon fibre layers in order to maintain their position and orientation, ready to be put in the wind turbine blade mould, allowing a single infusion to infuse both the glass fibre layers and the carbon fibre layers and minimizing the risk of introducing fibre misalignments, especially in carbon fibres, during the manufacturing process.

Figure 4A:
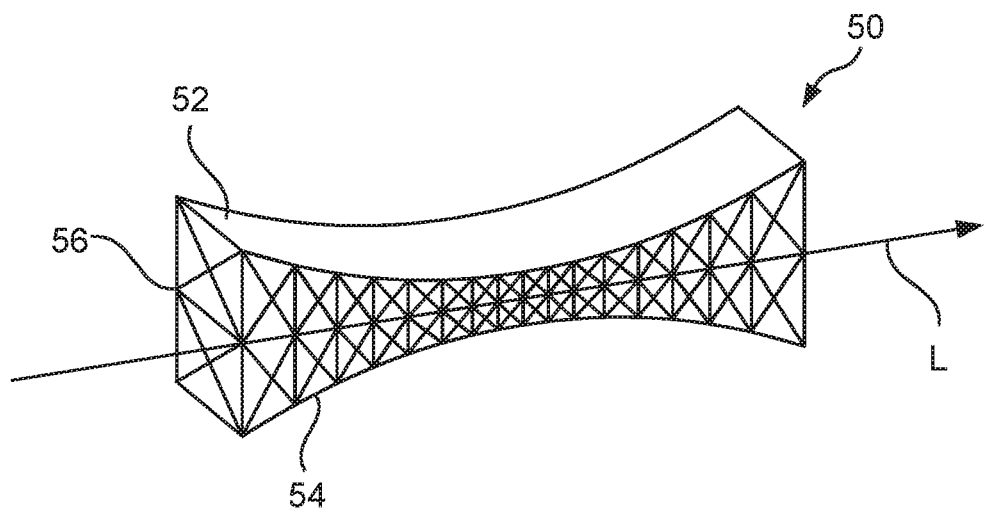
FIG. 4a-4c are schematic diagrams illustrating exemplary mould tools.
Figure 4B:
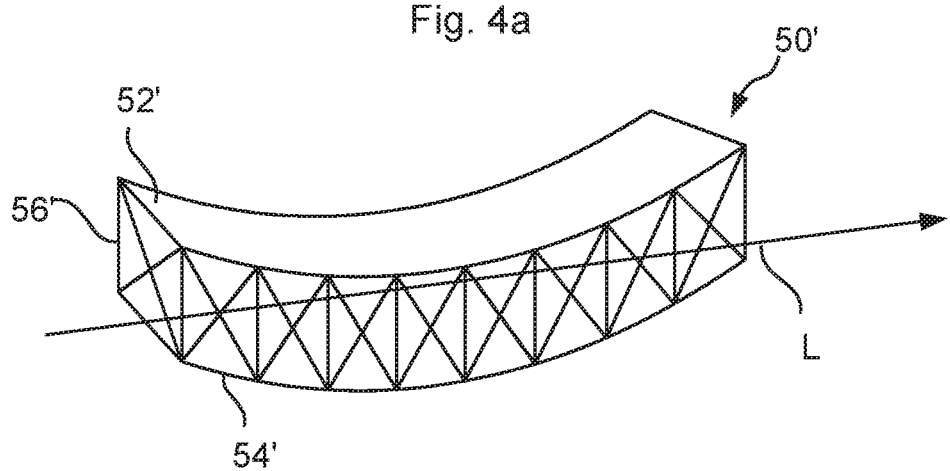
Figure 4C:
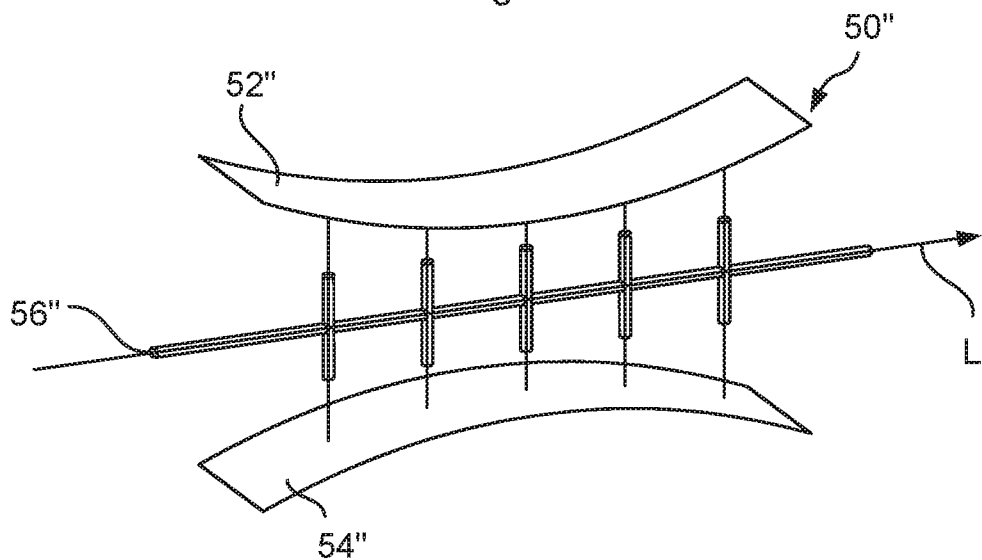

FIG. 4a-4c are schematic diagrams illustrating exemplary mould tools for manufacturing pre-form laminates, e.g. spar cap pre-form laminates. Alternatively, the pre-form laminates may be part of other parts of the wind turbine blade, such as the skin. The mould tools 50', 50', 50" are examples of different exemplary mould tools. The mould tool 50 in FIG. 4a comprises a rack 56, a first mould surface 52 and a second mould surface 54. The mould tool 50' in FIG. 4b comprises a rack 56', a first mould surface 52' and a second mould surface 54'. The mould tool 50" in FIG. 4c comprises a rack 56", a first mould surface 52" and a second mould surface 54". The rack 56, 56', 56" may comprise scaffolding such as the racks 56, 56' as exemplified in FIGS. 4a and 4b. Alternatively, the rack 56, 56', 56" may comprise a system of beams such as the rack 56" as exemplified in FIG. 4c. The first mould surface 52, 52', 52" and the second mould surface 54, 54', 54" may be curved. Alternatively, one or more of the first mould surfaces 52, 52', 52" and the second mould surfaces 54, 54', 54" may be planar. The first mould surface 52, 52', 52" may be arranged opposite the second mould surface 54, 54', 54". Alternatively, mould surfaces may abut other mould surfaces, e.g. mould surfaces may be perpendicular to each other. The first mould surface 52, 52', 52" and the second mould surface 54, 54', 54" may be concave or convex. The first mould surface 52, 52', 52" and the second mould surface 54, 54', 54" may have the same curvature or have different curvatures. As illustrated in FIG. 4b, the first mould surface 52' may be concave while the second mould surface 54' may be convex. The mould tools 50, 50', 50" extends along a longitudinal axis L.

The mould tools 50, 50', 50" may comprise a heating arrangement (not shown) configured for heating the mould surfaces 52, 52', 52", 54, 54', 54". The heating arrangement may be configured to heat the mould surfaces 52, 52', 52", 54, 54', 54" such that a tackifier or binder, such as glue, e.g. as provided with the fabric, are heated to consolidate the fabric and thus create a pre-form laminate. The heating arrangement may comprise a first heating element for heating the first mould surface 52, 52', 52" and a second heating element for heating the second mould surface 54, 54', 54".

For simplicity, the following figures may illustrate features with respect to only one or some of the mould tools 50, 50', 50" as illustrated in FIG. 4a-4c. However, any other mould tool, such as any other of the mould tools 50, 50', 50" of FIGS. 4a-4c, may comprise the features described in the following.

Figure 5A:
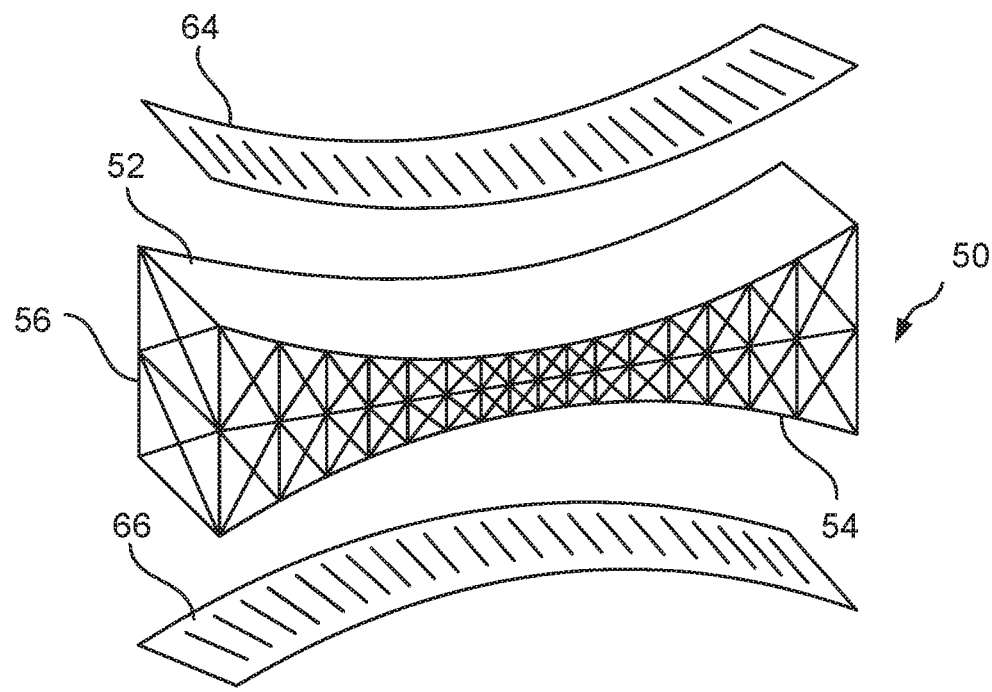
FIG. 5a-5b are schematic diagrams illustrating exemplary mould tools.
Figure 5B:
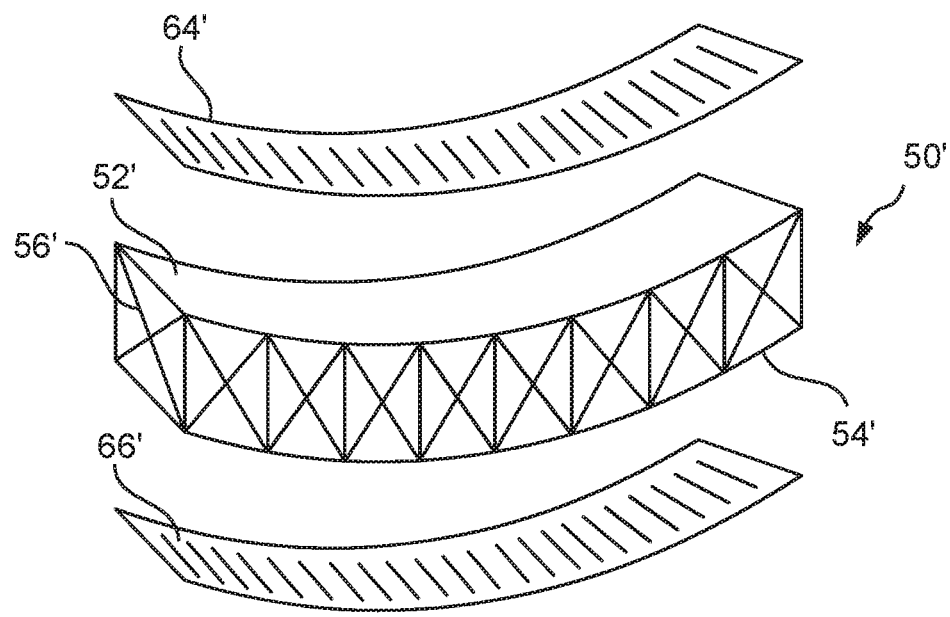

FIG. 5a-5b are schematic diagrams illustrating exemplary mould tools 50, 50', such as the mould tools 50, 50' of the previous figures. The mould tools 50, 50' comprise a first mould surface 52, 52' and a second mould surface 54, 54'. The first mould surface 52, 52' is configured for receiving a first fabric to create a first pre-form laminate 64, 64' and the second mould surface 54, 54' is configured for receiving a second fabric to create a second pre-form laminate 66, 66'.

Figure 6A:
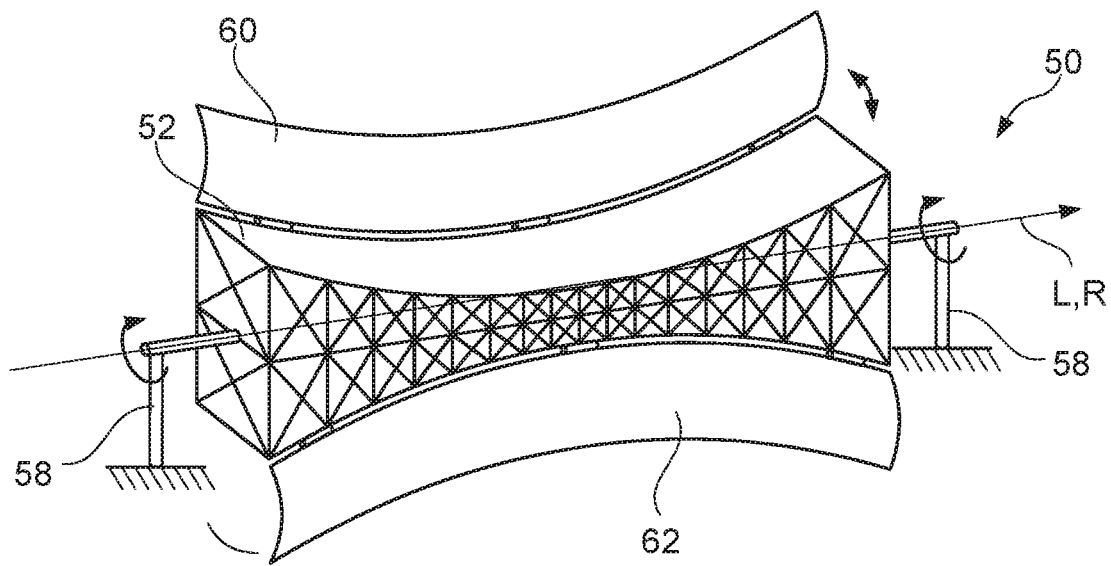
FIG. 6a-6b are schematic diagrams illustrating exemplary mould tools.
Figure 6B:
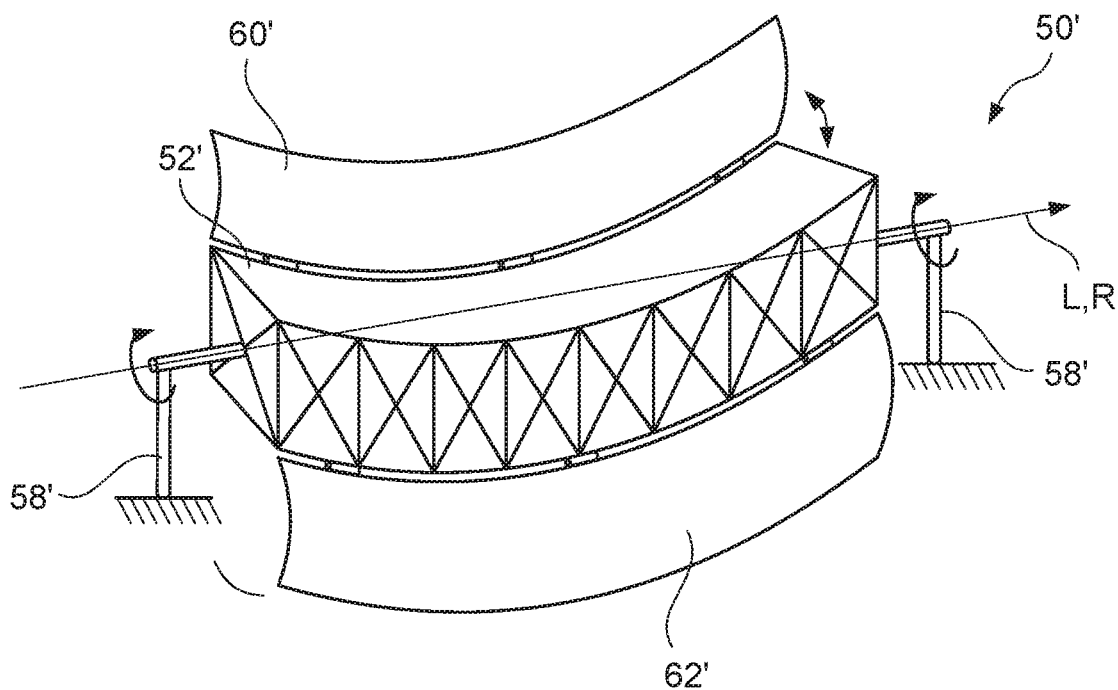

FIG. 6a-6b are schematic diagrams illustrating exemplary mould tools 50, 50', such as the mould tools 50, 50' of the previous figures. The mould tools 50, 50' comprise a first mould surface 52, 52' and a second mould surface 54, 54'. The mould tools 50, 50' comprise a turning device 58, 58' configured for turning the mould tools 50, 50' from a first configuration to a second configuration about a rotation axis R, such as the longitudinal axis L of the mould tools 50, 50'. The mould tools 50, 50' comprise a first sealing member 60, 60' and a second sealing member 62, 62'. As illustrated, the sealing members 60, 60', 62, 62' may be formed by a lid, e.g. a vacuum tight lid, e.g. a vacuum may be applied between the lid in a closed position and the respective mould surface. The lid may be secured in a closed position with a clamp and/or a plurality of clamps. The first sealing member 60, 60' is configured to restrain fabric on the first mould surface 52, 52', e.g. with vacuum applied between the first sealing member 60, 60' and the first mould surface 52, 52'. For example, the fabric may be restrained on the first mould surface 52, 52', when turning the mould tool 50, 50', such as when the first mould surface 52, 52' is facing downwards. The second sealing member 62, 62' is configured to restrain fabric on the second mould surface 54, 54', e.g. with vacuum applied between the second sealing member 62, 62' and the second mould surface 54, 54'. For example, the fabric may be restrained on the second mould surface 54, 54' when the second mould surface 54, 54' is facing downwards. Alternatively, sealing members may be provided by a vacuum bag applied to the mould surfaces and being fastened to the edges of the mould surfaces, and by applying a vacuum between the vacuum bag and the respective mould surface. The sealing members 60, 60', 62, 62' secures the pre-form laminates from falling out when the mould tools 50, 50' are turned. The sealing members 60, 60', 62, 62' also allow applying a vacuum for the consolidation process of the pre-form laminate.

Figure 7A:
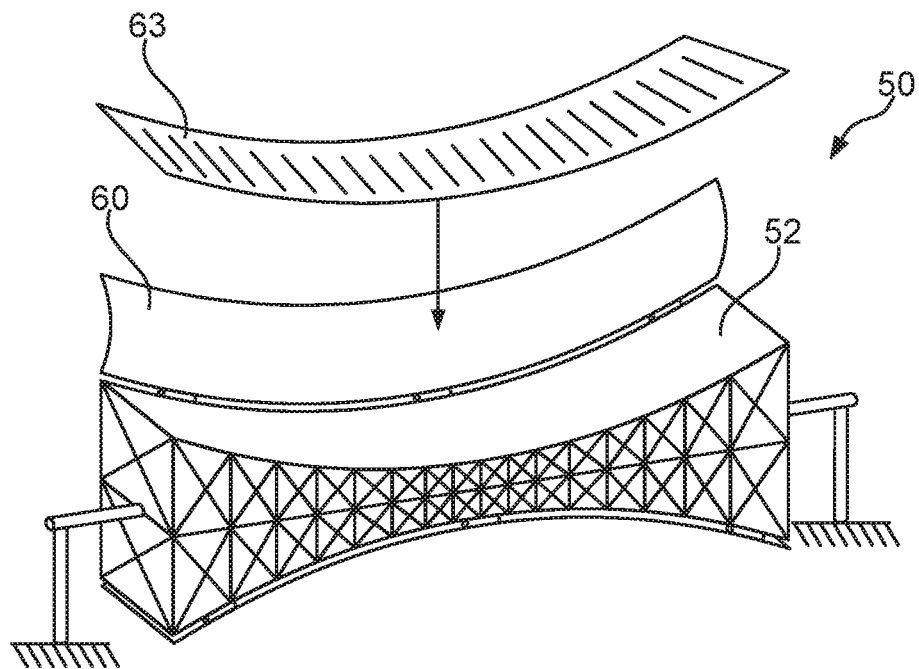
FIG. 7a-7p are schematic diagrams illustrating an exemplary method of manufacturing a pre-form laminate with a mould tool.
Figure 7B:
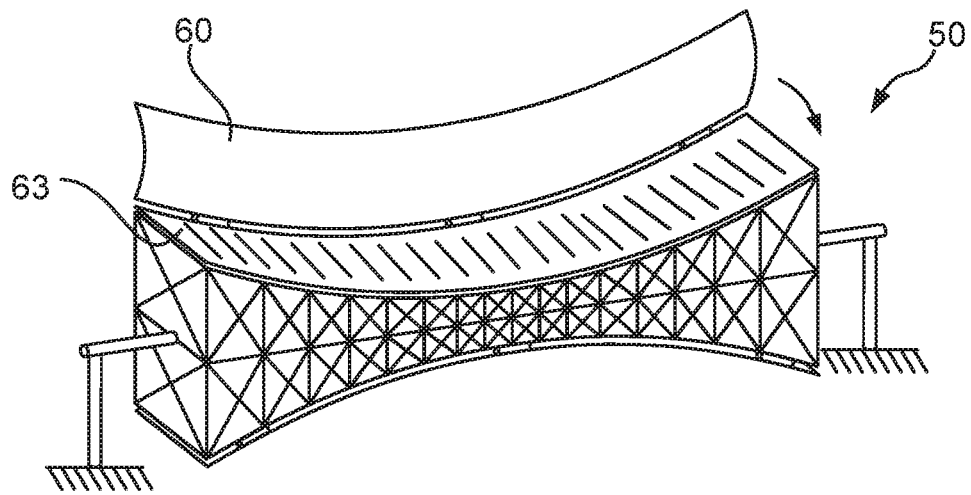
Figure 7C:
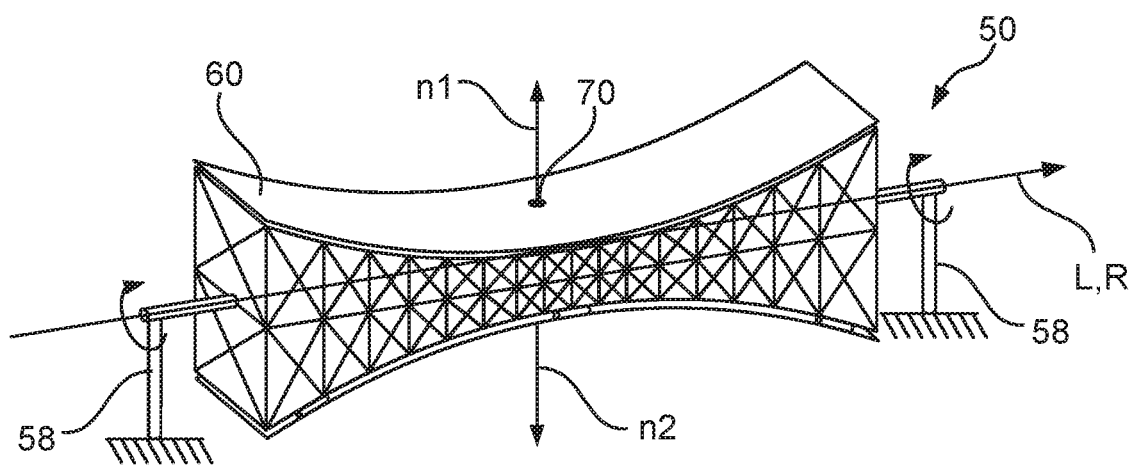
Figure 7D:
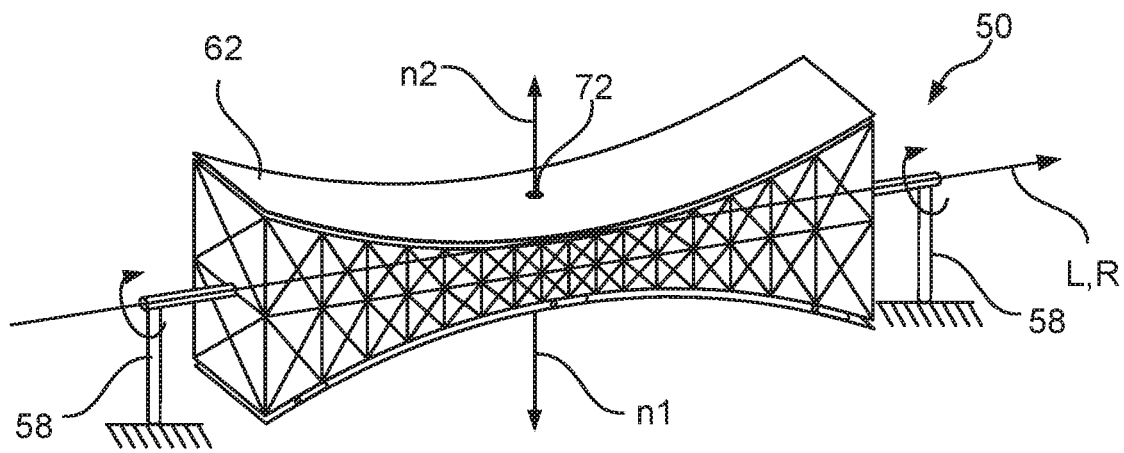
Figure 7E:
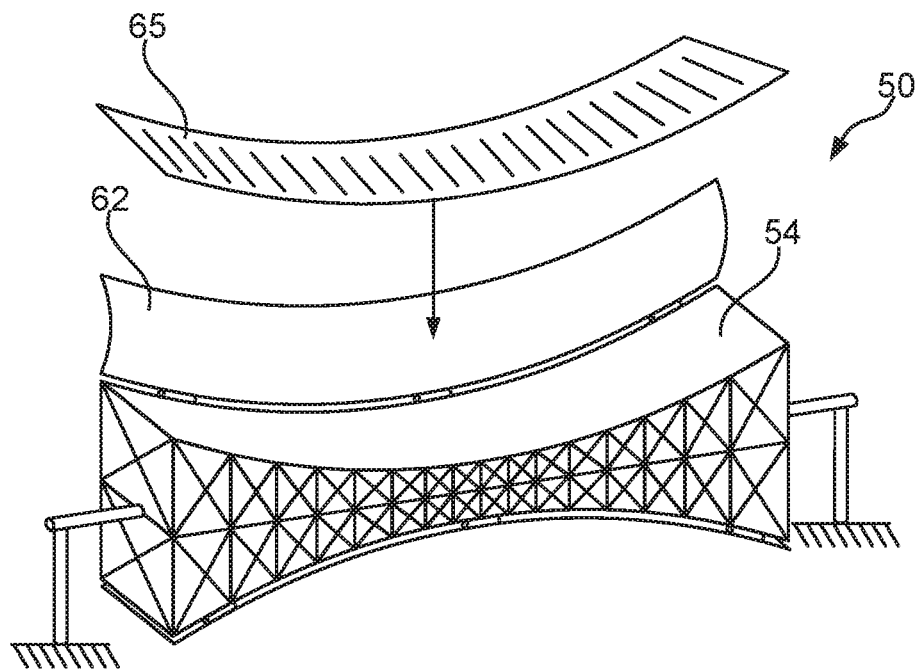
Figure 7F:
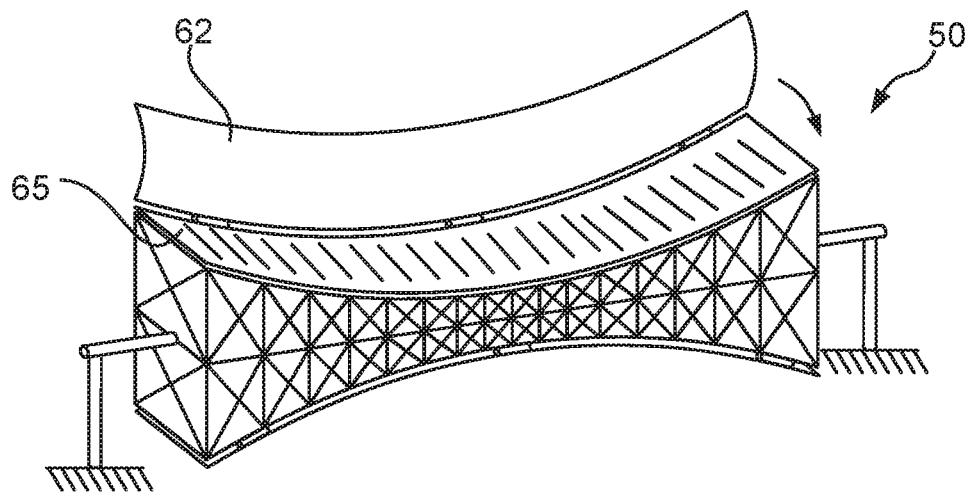
Figure 7G:
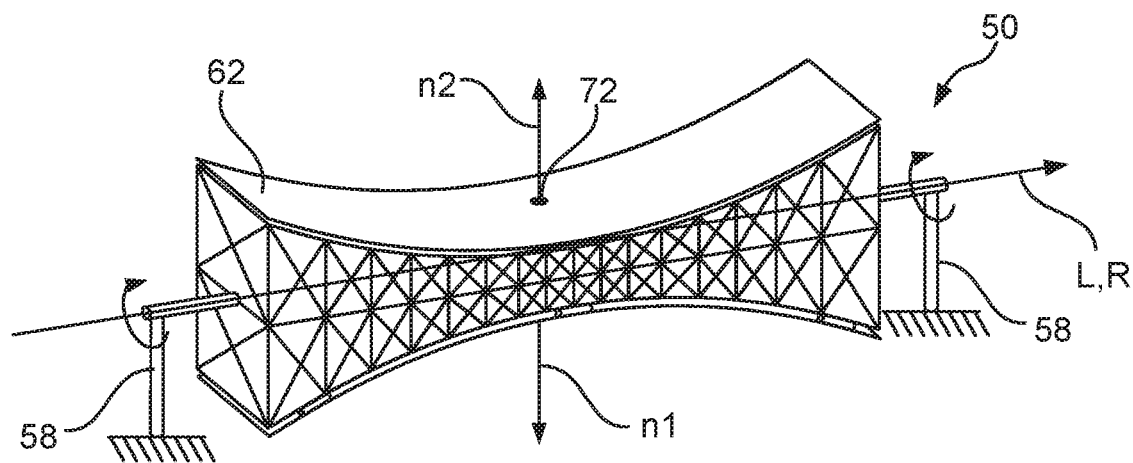
Figure 7H:
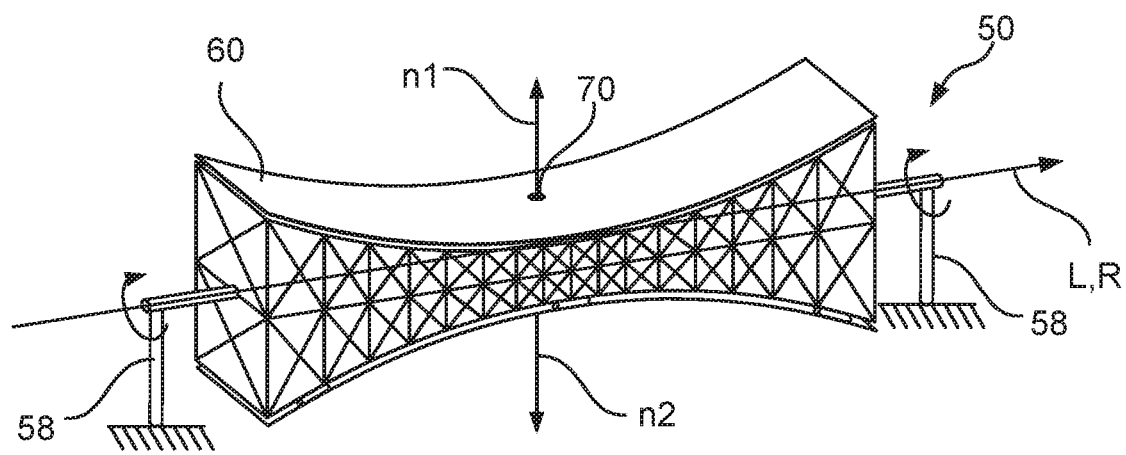
Figure 7I:
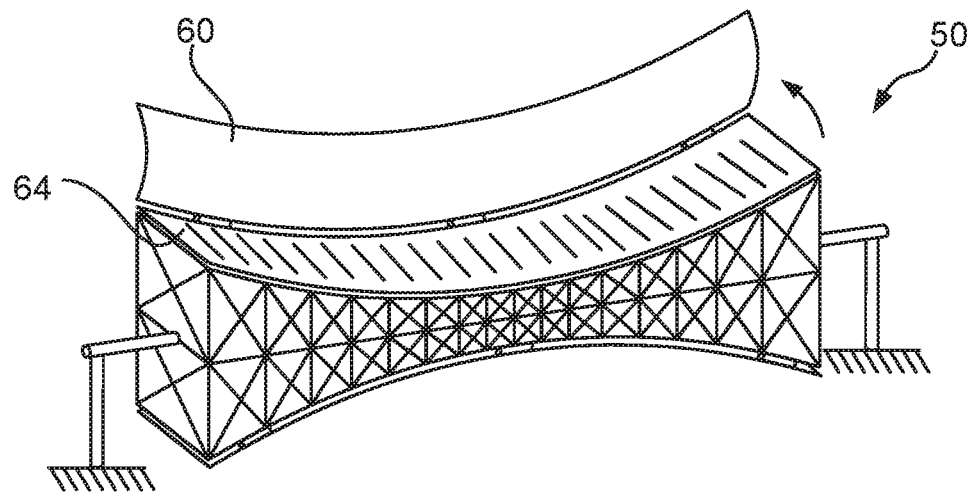
Figure 7J:
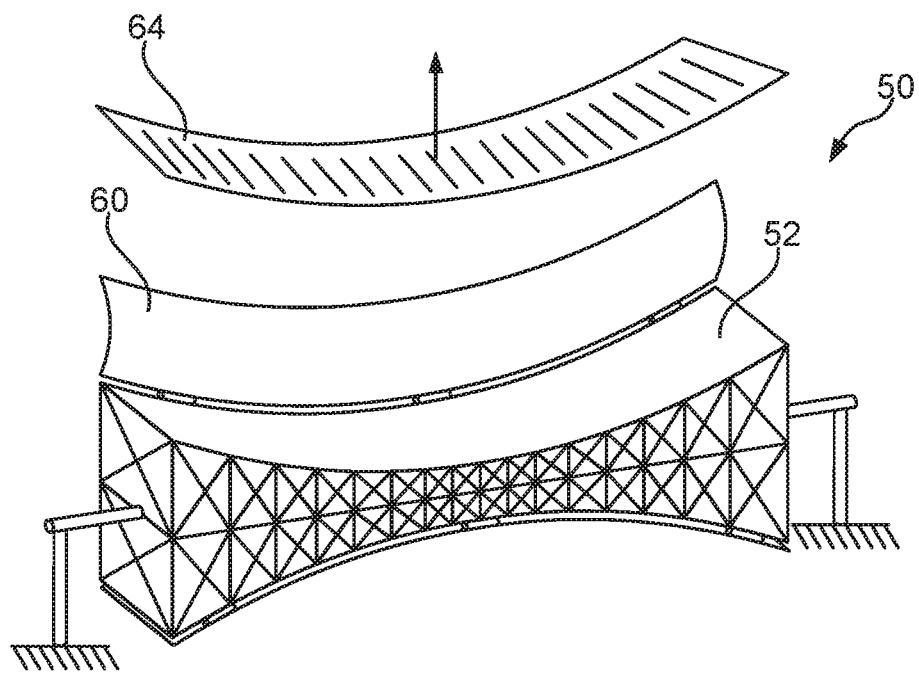
Figure 7K:
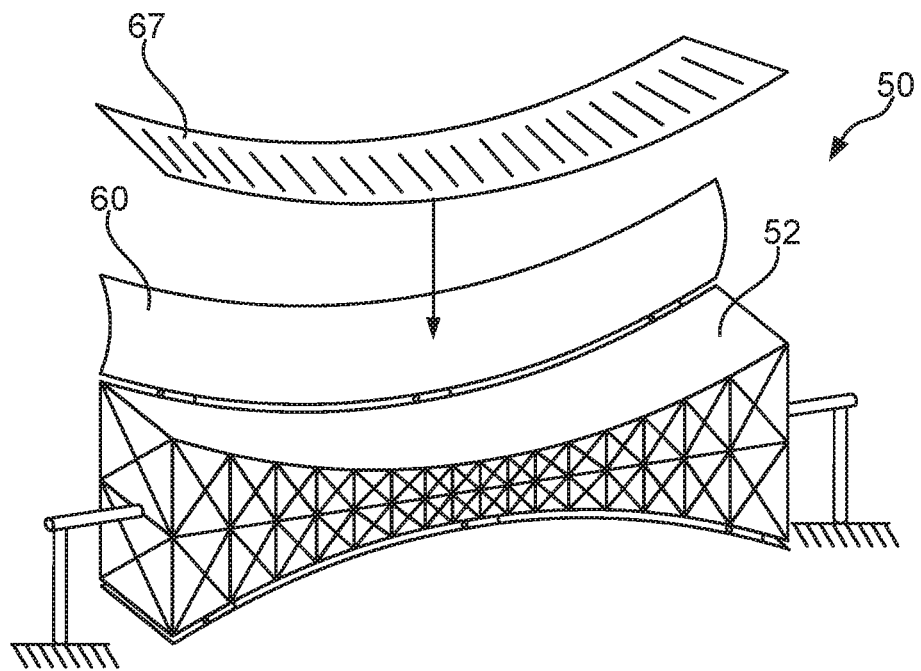
Figure 7L:
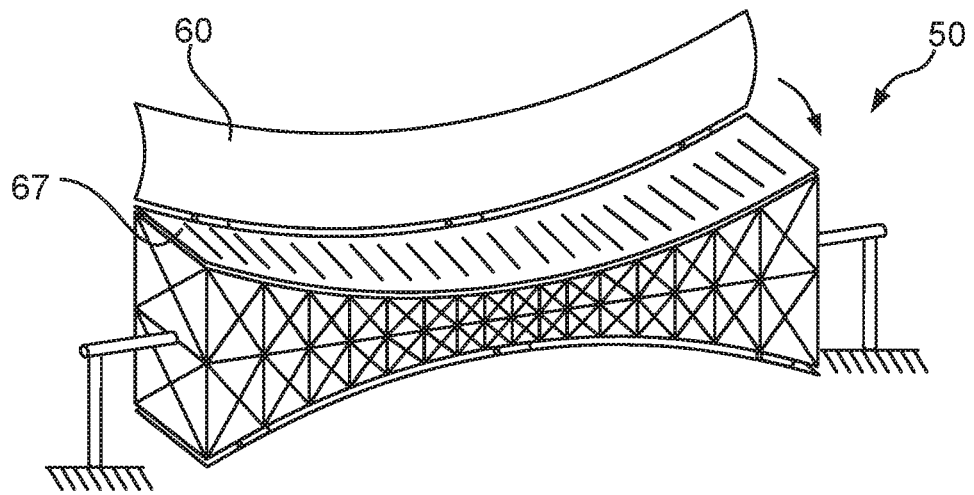
Figure 7M:
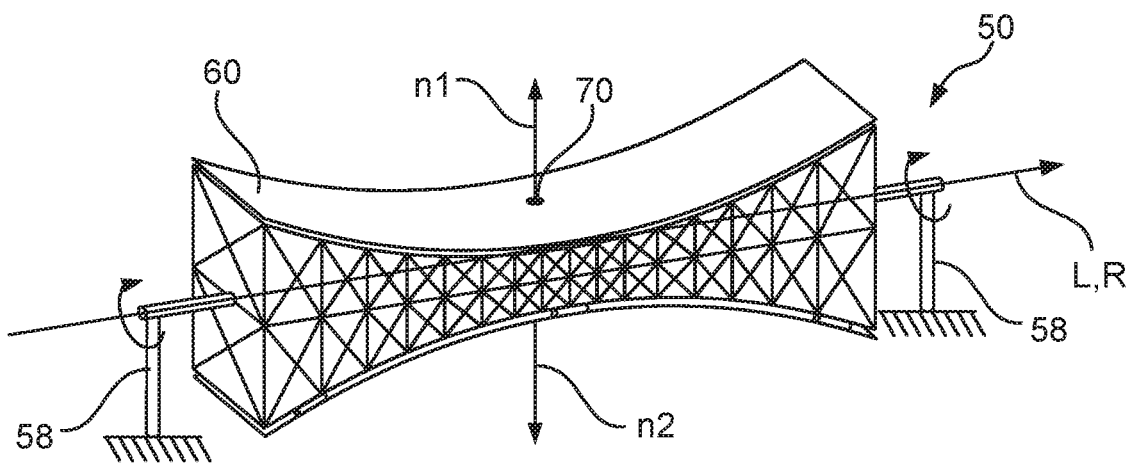
Figure 7N:
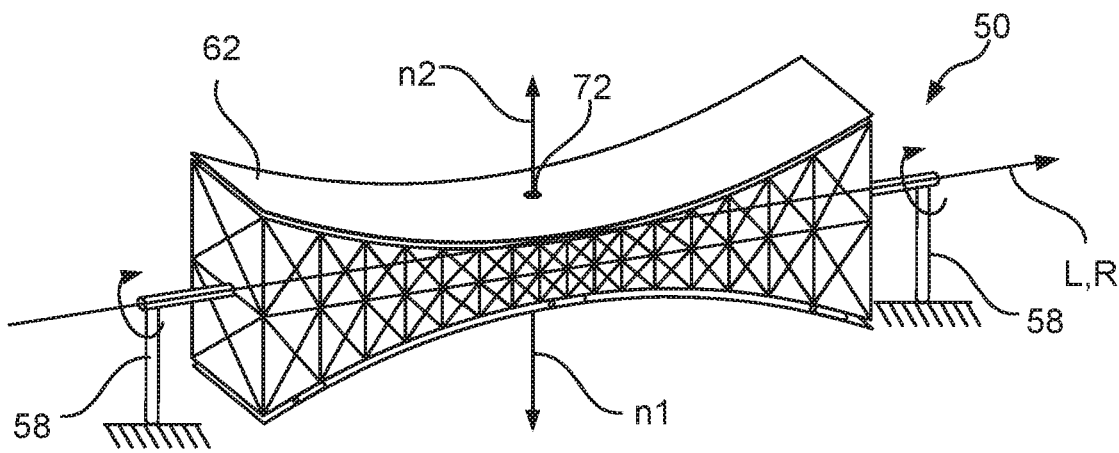
Figure 7O:
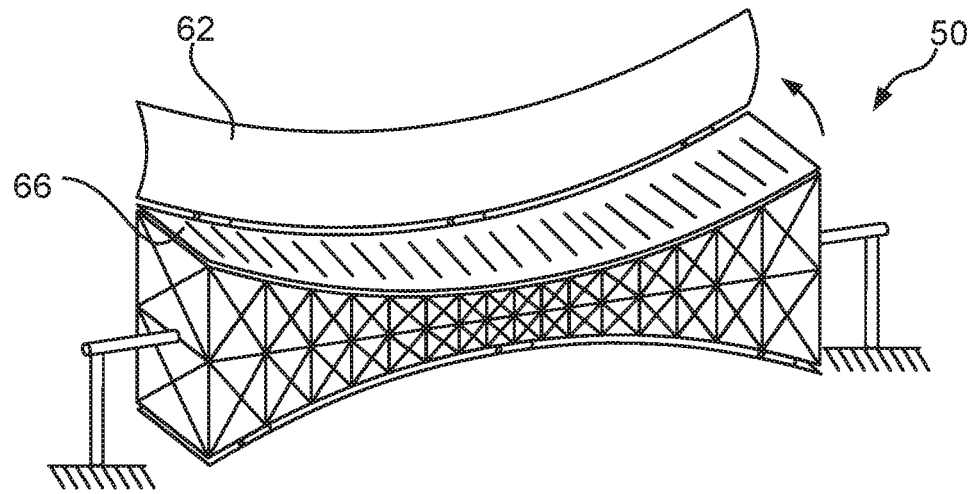
Figure 7P:
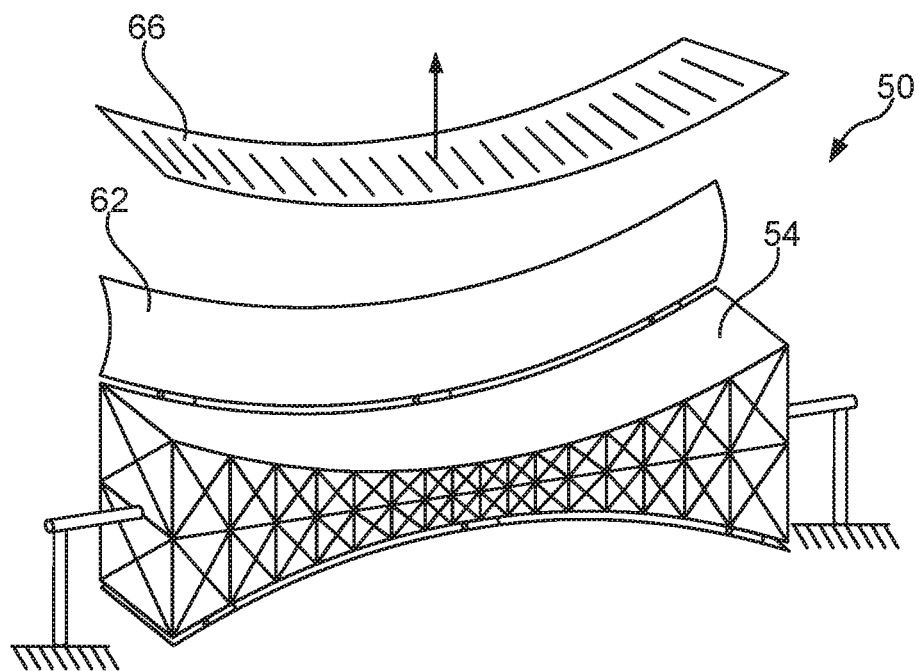

FIG. 7a-7p are schematic diagrams illustrating an exemplary method of manufacturing a pre-form laminate with a mould tool. For simplicity the method is illustrated with a mould tool 50, such as the mould tool 50 of FIG. 4a. However, the method is applicable to any exemplary mould tool.

The method comprises positioning the mould tool 50 in a first configuration, where the first mould surface 52 is facing substantially upwards (FIG. 7a). The method comprises providing a first fabric 63 (FIG. 7a). The first fabric 63 may comprise a plurality of sheets of fabric and/or a plurality of sets of a plurality of sheets of fabric. The first fabric 63 may comprise carbon fibre. The first fabric 63 may be prefabricated with a tackifier. Alternatively, the first fabric 63 may be dry fabric. The method comprises laying up the first fabric 63 on the first mould surface 52 and restraining the first fabric 63 on the first mould surface 52, e.g. with the first sealing member 60, i.e. by closing the lid (FIG. 7b). Furthermore, vacuum may be applied between the first sealing member 60 and the first mould surface 52. As also described above, the first sealing member may alternatively be a vacuum bag, which is applied to the first mould surface 52 and attached to the edges of the first mould surface 52.

The mould tool 50 comprises a heating arrangement (not shown) configured for heating the surface of the mould surfaces 52, 54. The heating arrangement heats the mould surfaces such that a tackifier or binder, such as glue, in the fabrics are heated to consolidate the fabric and thus create a pre-form laminate. The fabrics may be fabricated without any tackifiers, such as dry fabrics. In the case the fabrics are dry fabrics, a tackifier may be applied to the fabric, e.g. between sheets of the fabric, before the fabric is restrained to the mould surface. Alternatively, the fabrics may be prefabricated with tackifiers.

The method comprises consolidating the first fabric 63. Consolidating the first fabric 63 may comprise applying vacuum between the first sealing member 60 and the first mould surface 52 and heating the first fabric 63, e.g. by heating the first mould surface 52.

While consolidating the first fabric 63, which usually takes a few hours, and the first fabric 63 being restrained on the first mould surface 52, the mould tool 50 is turned from the first configuration (FIG. 7c) to a second configuration (FIG. 7d), e.g. with a turning device 58. In the first configuration (FIG. 7c) the first mould surface 52 is facing substantially upwards, e.g. such that a normal n1 at a first centre point 70 of the first mould surface 52 is pointing upwards, such as vertically upwards. In the first configuration (FIG. 7c) the second mould surface 54 is facing substantially downwards, e.g. such that a normal n2 at a second centre point 72 of the second mould surface 54 is pointing downwards, such as vertically downwards. In the second configuration (FIG. 7d) the first mould surface 52 is facing substantially downwards, e.g. such that the normal n1 at the first centre point 70 of the first mould surface 52 is pointing downwards, such as vertically downwards. In the second configuration the second mould surface 54 is facing substantially upwards, such that the normal n2 at the second centre point 72 of the second mould surface 54 is pointing upwards, such as vertically upwards.

The method comprises providing a second fabric 65 (FIG. 7e). The second fabric 65 may comprise a plurality of sheets of fabric and/or a plurality of sets of a plurality of sheets of fabric. The second fabric 65 may comprise carbon fibres. The second fabric 65 may be prefabricated with a tackifier. Alternatively, the second fabric 65 may be dry fabric. The method comprises laying up the second fabric 65 on the second mould surface 54 and restraining the second fabric 65 on the second mould surface 54, e.g. with the second sealing member 62, i.e. by closing the lid (FIG. 7f). Furthermore, vacuum may be applied between the second sealing member 62 and the second mould surface 54. As also described above, the second sealing member may alternatively be a vacuum bag, which is applied to the second mould surface 54 and attached to the edges of the second mould surface 54.

The method comprises consolidating the second fabric 65. Consolidating the second fabric 65 may comprise applying vacuum between the second sealing member 62 and the second mould surface 54 and heating the second fabric 65, e.g. by heating the second mould surface 54.

While consolidating the second fabric 65 and the second fabric 65 being restrained on the second mould surface 54, the mould tool 50 may be turned from the second configuration (FIG. 7g) to the first configuration (FIG. 7h), e.g. with the turning device 58. In the second configuration (FIG. 7g) the second mould surface 54 is facing substantially upwards, such that the normal n2 at the second centre point 72 of the second mould surface 54 is pointing upwards, such as vertically upwards. In the second configuration (FIG. 7g) the first mould surface 52 is facing substantially downwards, such that the normal n1 at the first centre point 70 of the first mould surface 52 is pointing downwards, such as vertically downwards. In the first configuration (FIG. 7h) the second mould surface 54 is facing substantially downwards, such that the normal n2 at the second centre point 72 of the second mould surface 54 is pointing downwards, such as vertically downwards. In the first configuration (FIG. 7g) the first mould surface 52 is facing substantially upwards, such that the normal n1 at the first centre point 70 of the first mould surface 52 is pointing upwards, such as vertically upwards.

The first fabric 63 forming a first pre-form laminate 64 is allowed to cool, e.g. before turning the mould tool from the second configuration to the first configuration (FIGS. 7g and 7h), and the first sealing member 60 is removed, such as opened, (FIG. 7i) and the first pre-form laminate 64 is demoulded (FIG. 7j).

The method may start over by providing a first secondary fabric 67 and laying up the first secondary fabric 67 on the first mould surface 52 (FIG. 7k). The first secondary fabric 67 may comprise a plurality of sheets of fabric and/or a plurality of sets of a plurality of sheets of fabric. The first secondary fabric 67 may comprise carbon fibres. The first secondary fabric 67 may be prefabricated with a tackifier. Alternatively, the first secondary fabric 67 may be dry fabric. The first secondary fabric 67 is restrained by closing the first sealing member 60 (FIG. 7l). The mould tool 50 is turned from the first configuration (FIG. 7m) to the second configuration (7n), e.g. with the turning device 58. The second fabric 65 forming a second pre-form laminate 66 is allowed to cool and the second sealing member 62 is removed, such as opened, (FIG. 7o) and the second pre-form laminate 66 is demoulded (FIG. 7p).

The method may be continued with providing a new fabric for as long as pre-form laminates are needed.

Although not specifically illustrated, the mould tool may comprise a third mould surface (e.g. the mould tool may have a triangular cross section), and the method may comprise, while consolidating the second fabric 65 and/or the first fabric 63, turning the mould tool to a third configuration, wherein the third mould surface is facing substantially upwards. The method may comprise providing a third fabric and laying up the third fabric on the third mould surface. The method may comprise restraining the third fabric with a third sealing member on the third mould surface. The method may comprise consolidating the third fabric, e.g. by applying vacuum between the third sealing member and the third mould surface and heating the third mould surface.

It will be realised that a mould tool according to the present disclosure may comprise any other reasonable plurality of mould surfaces, e.g. four mould surfaces, five mould surfaces, etc.

Figure 8A:
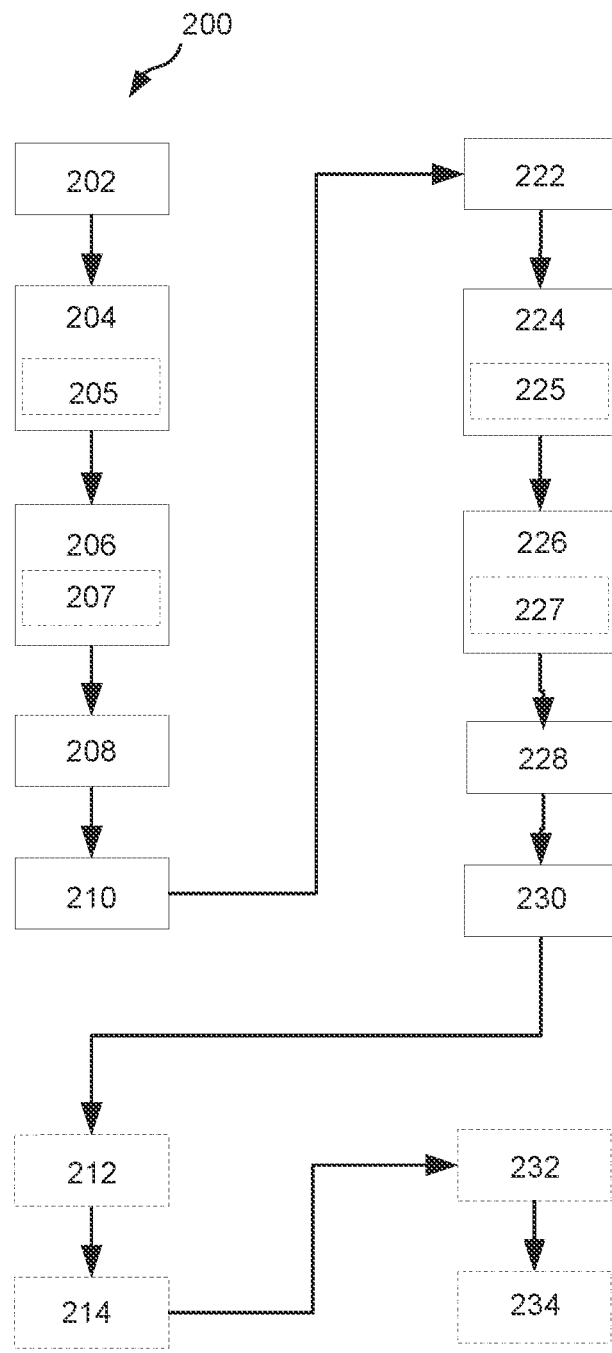
FIG. 8a is a block diagram of an exemplary method of manufacturing a plurality of pre-form laminates with a mould tool.
Figure 8B:
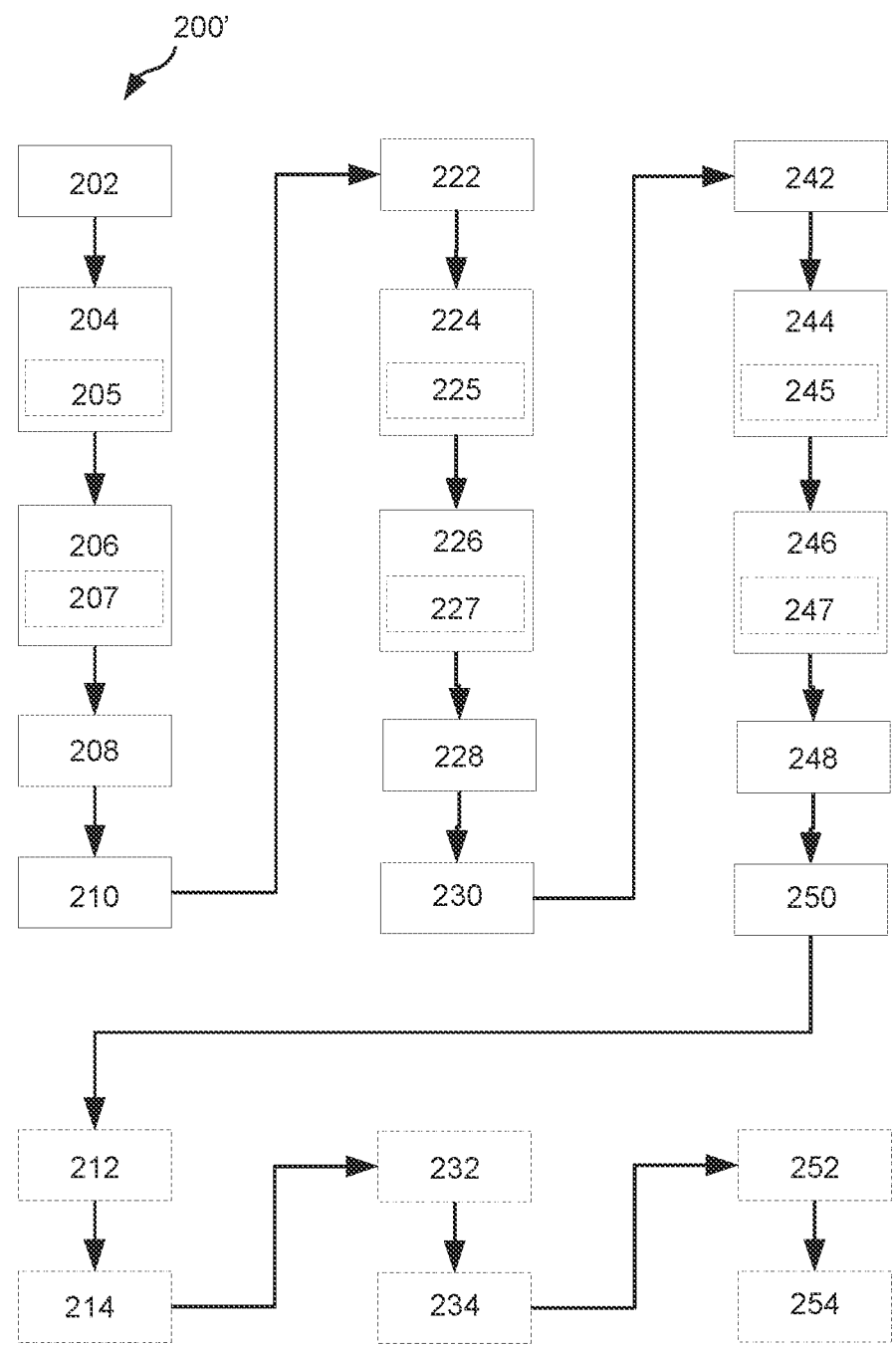
FIG. 8b is a block diagram of an exemplary method of manufacturing a plurality of pre-form laminates with a mould tool.

FIG. 8a-8b are block diagrams of exemplary methods 200, 200' for manufacturing a plurality of pre-form laminates for a laminate of a wind turbine blade with a mould tool, such as a mould tool 50, 50', 50" as described with respect to the previous figures.

In FIG. 8a the method 200 comprises positioning 202 the mould tool in a first configuration, wherein a first mould surface of the mould tool is facing substantially upwards. In the first configuration a second mould surface of the mould tool may be facing substantially downwards. The method 200 comprises providing 204 a first fabric and laying up 206 the first fabric on the first mould surface. Providing 204 the first fabric may comprise providing 205 a first fabric prefabricated with a tackifier. Laying up 206 the first fabric may comprise applying 207 a tackifier to the first fabric. The method 200 comprises restraining 208 the first fabric on the first mould surface. The method 200 comprises consolidating 210 the first fabric including heating the first mould surface to form a first pre-form laminate of the plurality of pre-form laminate. Consolidating 210 the first fabric may further include applying a vacuum between a first sealing member and the first mould surface.

The method 200 comprises while consolidating the first fabric turning 222 the mould tool to a second configuration wherein the second mould surface is facing substantially upwards. In the second configuration the first mould surface may be facing substantially downwards.

The method 200 comprises providing 224 a second fabric and laying up 226 the second fabric on the second mould surface. Providing 224 the second fabric may comprise providing 225 a second fabric prefabricated with a tackifier. Laying up 226 the second fabric may comprise applying 227 a tackifier to the second fabric. The method 200 comprises restraining 228 the second fabric on the second mould surface. The method 200 comprises consolidating 230 the second fabric including heating the second mould surface to form a second pre-form laminate of the plurality of pre-form laminates. Consolidating 230 the second fabric may further include applying a vacuum between a second sealing member and the second mould surface.

The method 200 may comprise turning 212 the mould tool to the first configuration and demoulding 214 the first pre-form laminate, e.g. while consolidating 230 the second fabric.

The method 200 may comprise turning 232 the mould tool to the second configuration and demoulding 234 the second pre-form laminate.

FIG. 8b illustrates a method 200' similar to the method 200, but with a mould tool comprising three (or more) mould surfaces. The method 200' comprises positioning 202 the mould tool in a first configuration, wherein a first mould surface of the mould tool is facing substantially upwards. In the first configuration a second mould surface and/or a third mould surface of the mould tool may be facing substantially downwards. The method 200' comprises providing 204 a first fabric and laying up 206 the first fabric on the first mould surface. Providing 204 the first fabric may comprise providing 205 a first fabric prefabricated with a tackifier. Laying up 206 the first fabric may comprise applying 207 a tackifier to the first fabric. The method 200' comprises restraining 208 the first fabric on the first mould surface. The method 200' comprises consolidating 210 the first fabric including heating the first mould surface to form a first pre-form laminate of the plurality of pre-form laminate. Consolidating 210 the first fabric may further include applying a vacuum between a first sealing member and the first mould surface.

The method 200' comprises while consolidating 210 the first fabric turning 222 the mould tool to a second configuration wherein the second mould surface is facing substantially upwards. In the second configuration the first mould surface and/or the third mould surface may be facing substantially downwards.

The method 200' comprises providing 224 a second fabric and laying up 226 the second fabric on the second mould surface. Providing 224 the second fabric may comprise providing 225 a second fabric prefabricated with a tackifier. Laying up 226 the second fabric may comprise applying 227 a tackifier to the second fabric. The method 200' comprises restraining 228 the second fabric on the second mould surface. The method 200' comprises consolidating 230 the second fabric including heating the second mould surface to form a second pre-form laminate of the plurality of pre-form laminates. Consolidating 230 the second fabric may further include applying a vacuum between a second sealing member and the second mould surface.

The method 200' comprises while consolidating 230 the second fabric and/or while consolidating 210 the first fabric turning 222 turning 242 the mould tool to a third configuration wherein the third mould surface is facing substantially upwards. In the third configuration the first mould surface and/or the second mould surface may be facing substantially downwards.

The method 200' comprises providing 244 a third fabric and laying up 246 the third fabric on the third mould surface. Providing 244 the third fabric may comprise providing 245 a third fabric prefabricated with a tackifier. Laying up 246 the third fabric may comprise applying 247 a tackifier to the third fabric. The method 200' comprises restraining 248 the third fabric on the third mould surface. The method 200' comprises consolidating 250 the third fabric including heating the third mould surface to form a third pre-form laminate of the plurality of pre-form laminates. Consolidating 250 the third fabric may further include applying a vacuum between a third sealing member and the third mould surface.

The method 200' may comprise turning 212 the mould tool to the first configuration and demoulding 214 the first pre-form laminate, e.g. while consolidating 250 the third fabric and/or while consolidating 230 the second fabric.

The method 200' may comprise turning 232 the mould tool to the second configuration and demoulding 234 the second pre-form laminate, e.g. while consolidating 250 the third fabric.

The method 200' may comprise turning 252 the mould tool to the third configuration and demoulding 254 the third pre-form laminate.

The invention has been described with reference to preferred embodiments. However, the scope of the invention is not limited to the illustrated embodiments, and alterations and modifications can be carried out without deviating from the scope of the invention.

LIST OF REFERENCES 2 wind turbine
4 tower
6 nacelle
8 hub
10 blade
14 blade tip
16 blade root
18 leading edge
20 trailing edge
24 first blade shell part (pressure side)
26 second blade shell part (suction side)
28 bond lines/glue joints
30 root region
32 transition region
34 airfoil region
36 first shell part flange
38 second shell part flange
40 shoulder
42 shear web or spar side
50, 50', 50" mould tool
52, 52', 52" first mould surface
54, 54', 54" second mould surface
56, 56', 56" rack
58, 58' turning device
60, 60' first sealing member
62, 62' second sealing member
63 first fabric
64, 64' first pre-form laminate
65 second fabric
66, 66' second pre-form laminate
67 first secondary fabric
68 third pre-form laminate
70 first centre point
72 second centre point
74 first spar cap
76 second spar cap
200 method
202 turning the mould tool
204 providing first fabric
205 providing a first fabric with a tackifier
206 laying up the first fabric
207 applying tackifier
208 restraining the first fabric
210 consolidating the first fabric
212 turning the mould tool
214 demoulding the first pre-form laminate
222 turning the mould tool
224 providing second fabric
226 laying up the second fabric
228 restraining the second fabric
230 consolidating the second fabric
232 turning the mould tool
234 demoulding the second pre-form laminate
242 turning the mould tool
244 providing third fabric
246 laying up the third fabric
248 restraining the third fabric
250 consolidating the third fabric

The invention claimed is:

1. A mould tool for manufacturing a plurality of pre-form laminates for a laminate of a wind turbine blade, the mould tool comprising:
 a frame;
 a first mould surface configured for receiving a first fabric;
 a second mould surface configured for receiving a second fabric; and
 a heating arrangement configured to heat the first mould surface and the second mould surface,
 wherein the mould tool is configured to turn between a first configuration and a second configuration, wherein in the first configuration the first mould surface is facing substantially upwards, and in the second configuration the second mould surface is facing substantially upwards,
 wherein the mould tool is configured to receive the first fabric on the first mould surface while being in the first configuration, and
 wherein the mould tool is configured to, while the first fabric is being consolidated, including heating the first mould surface and heating the first fabric with heat provided from the first mould surface, turn the mould tool to be in the second configuration and receive the second fabric on the second mould surface.

2. The mould tool according to claim 1, wherein the first mould surface comprises a first centre point, and the second mould surface comprises a second centre point, and wherein a normal to the first mould surface at the first centre point is pointing in a first primary direction in the first configuration and wherein a normal to the second mould surface at the second centre point is pointing in a second primary direction in the first configuration, wherein the first primary direction and the second primary direction are angularly spaced by more than 90 degrees.

3. The mould tool according to claim 1, comprising a turning device configured for turning the mould between the first configuration and the second configuration.

4. The mould tool according to claim 1, wherein the first mould surface and/or the second mould surface is curved.

5. The mould tool according to claim 4, wherein the curvature of the first mould surface and/or the second mould surface is concave, or wherein the curvature of the first mould surface and/or the second mould surface is convex, or wherein the curvature of the first mould surface is concave and the curvature of the second mould surface is convex.

6. The mould tool according to claim 1, comprising a first sealing member and a second sealing member, wherein the first and/or the second sealing member comprises a lid and optionally a clamp for locking the lid in a closed position.

7. The mould tool according to claim 1, comprising a third mould surface, wherein the mould tool is configured to turn between the first configuration, the second configuration and a third configuration, wherein in the third configuration the third mould surface is facing substantially upwards.

8. The mould tool according to claim 1, wherein the mould tool is further configured to, while consolidating the second fabric:
   turn to the first configuration; and
   demould a first pre-form laminate, and
   wherein the mould tool is further configured to, after demoulding the first pre-form laminate:
   provide a first secondary fabric;
   lay up the first secondary fabric on the first mould surface;
   restrain the first secondary fabric on the first mould surface; and
   consolidate the first secondary fabric including heating the first mould surface to form a first secondary pre-form laminate of the plurality of pre-form laminates.

9. The mould tool according to claim 1, wherein the first and second mould surfaces are each curved.

10. A method for manufacturing a plurality of pre-form laminates for a laminate of a wind turbine blade with a mould tool according to claim 1, the method comprising:
    positioning the mould tool in the first configuration;
    providing the first fabric;
    laying up the first fabric on the first mould surface;
    restraining the first fabric on the first mould surface;
    consolidating the first fabric, including heating the first mould surface and heating the first fabric with heat provided from the first mould surface, to form a first pre-form laminate of the plurality of pre-form laminates, and while consolidating the first fabric:
    turning the mould tool to the second configuration;
    providing the second fabric;
    laying up the second fabric on the second mould surface;
    restraining the second fabric on the second mould surface; and
    consolidating the second fabric, including heating the second mould surface to form a second pre-form laminate of the plurality of pre-form laminates.

11. The method according to claim 10, comprising, while consolidating the second fabric:
    turning the mould tool to the first configuration; and
    demoulding the first pre-form laminate.

12. The method according to claim 11, comprising, after demoulding the first pre-form laminate:
    providing a first secondary fabric;
    laying up the first secondary fabric on the first mould surface;
    restraining the first secondary fabric on the first mould surface; and
    consolidating the first secondary fabric including heating the first mould surface to form a first secondary pre-form laminate of the plurality of pre-form laminates.

13. The method according to claim 10, comprising, while consolidating the second fabric:
    turning the mould tool to a third configuration, wherein in the third configuration, a third mould surface is facing substantially upwards;
    providing a third fabric;
    laying up the third fabric on the third mould surface;
    restraining the third fabric on the third mould surface; and
    consolidating the third fabric including heating the third mould surface to form a third pre-form laminate of the plurality of pre-form laminates.

14. The method according to claim 11, comprising:
    returning the mould tool to the second configuration; and
    demoulding the second pre-form laminate.

15. The method according to claim 10, wherein laying up the first fabric on the first mould surface comprises applying a tackifier to the first fabric, and/or wherein laying up the second fabric on the second mould surface comprises applying a tackifier to the second fabric.

16. The method according to claim 10, wherein providing the first fabric comprises providing a first fabric prefabricated with a tackifier, and/or wherein providing the second fabric comprises providing a second fabric prefabricated with a tackifier.

* * * * *